US008026694B2

(12) United States Patent
Kamijo et al.

(10) Patent No.: US 8,026,694 B2
(45) Date of Patent: Sep. 27, 2011

(54) POWER TRANSMISSION CONTROL DEVICE, POWER TRANSMISSION DEVICE, NON-CONTACT POWER TRANSMISSION SYSTEM, AND ELECTRONIC INSTRUMENT

(75) Inventors: Takahiro Kamijo, Fujimi-cho (JP); Minoru Hasegawa, Suwa (JP); Haruhiko Sogabe, Chino (JP); Kota Onishi, Nagoya (JP); Masayuki Kamiyama, Nagoya (JP); Nobutaka Shiozaki, Nagoya (JP)

(73) Assignee: Seiko Epson Corporation, Tokyo (JP)

( * ) Notice: Subject to any disclaimer, the term of this patent is extended or adjusted under 35 U.S.C. 154(b) by 730 days.

(21) Appl. No.: 12/163,136

(22) Filed: Jun. 27, 2008

(65) Prior Publication Data

US 2009/0001932 A1 Jan. 1, 2009

(30) Foreign Application Priority Data

Jun. 29, 2007 (JP) ................................ 2007-172489

(51) Int. Cl.
*H01M 10/46* (2006.01)
(52) U.S. Cl. ....................................... 320/108
(58) Field of Classification Search .................. 320/106, 320/107, 108, 114; 307/43, 104
See application file for complete search history.

(56) References Cited

U.S. PATENT DOCUMENTS

| 6,316,909 | B1 | 11/2001 | Honda et al. |
| 2007/0216392 | A1 | 9/2007 | Stevens et al. |
| 2007/0228833 | A1 | 10/2007 | Stevens et al. |
| 2009/0001818 | A1* | 1/2009 | Iisaka et al. ................... 307/104 |

FOREIGN PATENT DOCUMENTS

| JP | A-09-103037 | 4/1997 |
| JP | A-11-341711 | 12/1999 |
| JP | A-2001-218391 | 8/2001 |
| JP | A-2006-060909 | 3/2006 |
| JP | B2-3826407 | 9/2006 |
| JP | A-2007-537688 | 12/2007 |
| WO | WO 2008/056415 A1 | 5/2008 |

OTHER PUBLICATIONS

Related case U.S. Appl. No. 12/071,150, filed Feb. 15, 2008.
Related case U.S. Appl. No. 12/007,671, filed Jan. 14, 2008.

* cited by examiner

*Primary Examiner* — Edward Tso
(74) *Attorney, Agent, or Firm* — Oliff & Berridge, PLC

(57) ABSTRACT

A power-transmission-side control circuit causes a power transmission device to perform temporary power transmission when a switch provided in a power-transmission-side instrument has been turned ON, and performs ID authentication based on ID authentication information. The power-transmission-side control circuit detects the presence or absence of a foreign object during normal power transmission by monitoring a change in induced voltage in a primary coil, causes the power transmission device to stop temporary power transmission when the ID authentication information from the power reception device has not been received within a given period of time, causes the power transmission device to stop temporary power transmission when the ID authentication has failed, and causes the power transmission device to stop normal power transmission when removal, a metal foreign object, a takeover state, or a full-charge state has been detected after normal power transmission has started.

17 Claims, 17 Drawing Sheets

POWER TRANSMISSION CONTROL DEVICE, POWER TRANSMISSION DEVICE, NON-CONTACT POWER TRANSMISSION SYSTEM, AND ELECTRONIC INSTRUMENT

Japanese Patent Application No. 2007-172489 filed on Jun. 29, 2007, is hereby incorporated by reference in its entirety.

BACKGROUND OF THE INVENTION

The present invention relates to a power transmission control device, a power transmission device, a non-contact power transmission system, and an electronic instrument.

In recent years, non-contact power transmission (contactless power transmission) that utilizes electromagnetic induction to enable power transmission without metal-to-metal contact has attracted attention. As application examples of non-contact power transmission, charging a portable telephone, a household appliance (e.g., cordless telephone handset or watch), and the like has been proposed.

JP-A-2006-60909 discloses a non-contact power transmission device using a primary coil and a secondary coil, for example.

A non-contact power transmission device is strongly desired to consume only a small amount of power in order to increase the life of a battery of an electronic instrument, for example. Therefore, it is important to suppress unnecessary power transmission from a primary-side instrument (power-transmission-side instrument) to a secondary-side instrument (power-reception-side instrument) as much as possible.

A non-contact power transmission device is desired to achieve a high degree of safety and reliability. For example, when power is transmitted to a non-standard secondary-side instrument, the instrument may break down.

Even when power is transmitted to a secondary-side instrument that conforms to a specific standard, power transmission must be stopped when the power transmission environment is inappropriate.

For example, when power is transmitted in a state in which a metal foreign object is present, abnormal heat generation may occur. In this case, power transmission must be stopped. A metal foreign object may be small or medium-sized, or may be large (e.g., a thin sheet which is present over the entire area between a primary-side instrument and a secondary-side instrument). Therefore, it is desirable to take appropriate safety measures irrespective of the size or type of foreign object.

A non-contact power transmission device is also desired to improve convenience to the user.

Moreover it is important to reduce the size and the cost of a non-contact power transmission device by reducing the number of parts.

SUMMARY

According to one aspect of the invention, there is provided a power transmission control device provided in a power transmission device, the power transmission device being included in a non-contact power transmission system that performs non-contact power transmission from the power transmission device to a power reception device through a primary coil and a secondary coil that are electromagnetically coupled, the power transmission control device comprising:

a power-transmission-side control circuit that controls power transmission to the power reception device, the power-transmission-side control circuit causing the power transmission device to perform temporary power transmission to the power reception device to enable ID authentication on the power reception device when a switch provided in a power-transmission-side instrument has been turned ON, performing ID authentication based on ID authentication information transmitted from the power reception device that has received the temporary power transmission, causing the power transmission device to perform normal power transmission to the power reception device after the conformity of the power reception device has been authenticated by the ID authentication, and causing the power transmission device to stop the temporary power transmission and return to an initial state that waits for the switch to be turned ON when the ID authentication information from the power reception device has not been received within a given period of time after the temporary power transmission has started, or the ID authentication has failed.

According to another aspect of the invention, there is provided a power transmission device comprising:

the above power transmission control device; and a power transmission section that generates an alternating-current voltage and supplies the alternating-current voltage to the primary coil.

According to another aspect of the invention, there is provided a non-contact power transmission system comprising a power transmission device and a power reception device, when a switch provided in a power-transmission-side instrument has been turned ON, the non-contact power transmission system performing non-contact power transmission from the power transmission device to the power reception device through a primary coil and a secondary coil that are electromagnetically coupled, the power transmission device including a power-transmission-side control circuit that controls power transmission to the power reception device based on an induced voltage in the primary coil;

the power reception device including:

a power supply control section that controls power supply to a power-supply-target load; and a power reception control device that includes a power-reception-side control circuit that controls the power reception device; and the power-transmission-side control circuit of the power transmission device causing the power transmission device to perform temporary power transmission to the power reception device to enable ID authentication on the power reception device when the switch provided in the power-transmission-side instrument has been turned ON, performing ID authentication based on ID authentication information transmitted from the power reception device that has received the temporary power transmission, causing the power transmission device to perform normal power transmission to the power reception device after the conformity of the power reception device has been authenticated by the ID authentication, and causing the power transmission device to stop the temporary power transmission and return to an initial state that waits for the switch to be turned ON when the ID authentication information from the power reception device has not been received within a given period of time after the temporary power transmission has started, or the ID authentication has failed.

According to another aspect of the invention, there is provided a non-contact power transmission system comprising a power transmission device and a power reception device, when a switch provided in a power-transmission-side instrument has been turned ON, the non-contact power transmission system performing non-contact power transmission from the power transmission device to the power reception device through a primary coil and a secondary coil that are electromagnetically coupled, the power transmission device including a power-transmission-side control circuit that controls power transmission to the power reception device based on an induced voltage in the primary coil;

the power reception device including:

a load modulation section that modulates a load of the power reception device;

a power supply control section that controls power supply to a power-supply-target load; and a power reception control device that includes a full-charge detection section that detects whether or not the power-supply-target load has been fully charged, and a power-reception-side control circuit that controls the power reception device;

the power-reception-side control circuit causing the power reception device to transmit ID authentication information to the power transmission device due to load modulation by the load modulation section when the power reception device has received the temporary power transmission from the power transmission device, causing the power supply control section to supply power to the power-supply-target load when the power reception device has received the normal power transmission from the power transmission device, causing the load modulation section to operate to intermittently change the load of the power reception device in order to detect a takeover state when power is supplied to the power-supply-target load, and transmitting a full-charge notification to the power transmission device due to load modulation by the load modulation section when the full-charge detection section has detected that the power-supply-target load has been fully charged; and the power-transmission-side control circuit causing the power transmission device to perform the temporary power transmission to the power reception device to enable ID authentication on the power reception device when the switch has been turned ON, performing ID authentication based on the ID authentication information transmitted from the power reception device that has received the temporary power transmission, causing the power transmission device to stop the temporary power transmission and return to an initial state that waits for the switch to be turned ON when the ID authentication information from the power reception device has not been received within a given period of time after the temporary power transmission has started, causing the power transmission device to stop the temporary power transmission and return to the initial state when the ID authentication has failed, causing the power transmission device to perform the normal power transmission to the power reception device after the conformity of the power reception device has been authenticated by the ID authentication, detecting the presence or absence of a foreign object during the normal power transmission based on a change in waveform of an induced voltage signal of the primary coil, detecting whether or not the takeover state has occurred by determining whether or not a signal based on the intermittent load modulation by the power reception device can be detected, and causing the power transmission device to stop the normal power transmission and return to the initial state when a foreign object or the takeover state has been detected or it has been detected that the power-supply-target load of the power reception device has been fully charged.

According to another aspect of the invention, there is provided an electronic instrument comprising:

a switch that causes power transmission to start or stop; and the above power transmission device.

BRIEF DESCRIPTION OF THE SEVERAL VIEWS OF THE DRAWING

FIGS. 13A and 1313 are cross-sectional views of electronic instruments that form a non-contact power transmission system which are illustrative of foreign object insertion (takeover state) after normal power transmission has started.

DETAILED DESCRIPTION OF THE EMBODIMENT

Figure 1A:
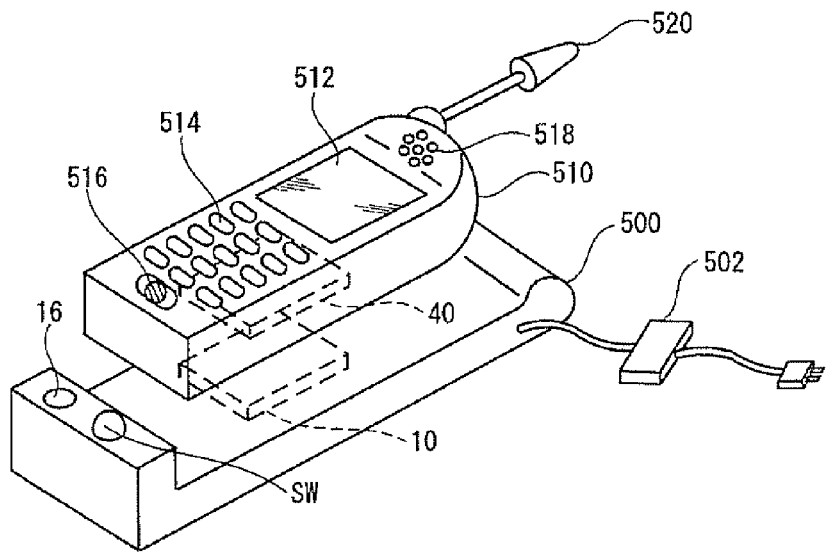
FIGS. 1A to 1C are views illustrative of examples of an electronic instrument compliant with non-contact power transmission and the principle of non-contact power transmission using an induction transformer.

Several embodiments of the invention may provide non-contact power transmission technology that improves convenience to the user and thoroughly reduce power consumption, for example. Several embodiments of the invention may provide highly reliable non-contact power transmission technology that ensures appropriate safety measures, for example.

Several embodiments of the invention may provide non-contact power transmission technology that sufficiently takes convenience to the user into account, for example. Several embodiments of the invention may provide non-contact power transmission technology that reduces the size and the cost of a non-contact power transmission device by reducing the number of parts, for example.

(1) According to one embodiment of the invention, there is provided a power transmission control device provided in a power transmission device, the power transmission device being included in a non-contact power transmission system that performs non-contact power transmission from the power transmission device to a power reception device through a primary coil and a secondary coil that are electromagnetically coupled, the power transmission control device comprising:

a power-transmission-side control circuit that controls power transmission to the power reception device, the power-transmission-side control circuit causing the power transmission device to perform temporary power transmission to the power reception device to enable ID authentication on the power reception device when a switch provided in a power-transmission-side instrument has been turned ON, performing ID authentication based on ID authentication information transmitted from the power reception device that has received the temporary power transmission, causing the power transmission device to perform normal power transmission to the power reception device after the conformity of the power reception device has been authenticated by the ID authentication, and causing the power transmission device to stop the temporary power transmission and return to an initial state that waits for the switch to be turned ON when the ID authentication information from the power reception device has not been received within a given period of time after the temporary power transmission has started, or the ID authentication has failed.

Power transmission (temporary power transmission for ID authentication and the like) from the power-transmission-side instrument to the power-reception-side instrument starts when the switch provided in the power-transmission-side instrument has been turned ON (triggered by the switch). The switch is utilized so that the user turns ON the switch after placing the secondary-side instrument or places the secondary-side instrument after turning ON the switch, for example. In either case, since power transmission (including temporary power transmission) starts when the user has turned ON the switch (i.e., the user has indicated his intention to start charging), a situation in which power transmission starts by surprise is prevented so that the user feels more reassured.

When the secondary-side instrument has been placed, the switch may be turned ON due to the weight of the secondary-side instrument. In this case, the user need not turn ON the switch.

The term "temporary power transmission" refers to power transmission (e.g., intermittent power transmission) to the power reception device performed before normal power transmission. The power transmission frequency during temporary power transmission may be the same as or differ from the power transmission frequency during normal power transmission. The term "normal power transmission" refers to continuous power transmission for supplying power to the load, for example.

According to this configuration, power need not be transmitted before the switch is turned ON. For example, it is unnecessary to perform temporary power transmission in order to detect placement of the secondary-side instrument. A reduction in power consumption and an increase in safety can be achieved by omitting unnecessary power transmission. Moreover, since ID authentication based on the ID authentication information (e.g., a manufacturer number, an instrument ID number, and power rating information) from the power-reception-side instrument that has received temporary power transmission is performed after the switch has been turned ON, and the power reception device stops temporary power transmission and returns to the initial state (switch ON wait state) when the power transmission device has not received the ID authentication information from the power reception device within a given period of time or has failed in ID authentication, a situation in which power is transmitted to an inappropriate target is reliably prevented so that reliability and safety are improved.

Since the power reception device stops temporary power transmission and returns to the switch ON wait state, unnecessary power consumption does not occur, whereby power consumption is reduced.

(2) In the power transmission control device, the power-transmission-side control circuit may cause the power transmission device to stop the temporary power transmission and return to the initial state when the ID authentication has successively failed a plurality of times.

Since the power reception device does not return to the initial state, even when ID authentication has accidentally failed for some reason, by causing the power reception device to return to the initial state when the power transmission device has successively failed in ID authentication a plurality of times, the user need not unnecessarily turn ON the switch again. This improves convenience to the user.

(3) In the power transmission control device, the power-transmission-side control circuit may cause the power transmission device to stop the normal power transmission and return to the initial state when a power transmission stop request from the power reception device has been received after the normal power transmission has started.

Since power transmission (normal power transmission) is stopped based on the power transmission stop request from the power-reception-side instrument, unnecessary power transmission does not occur so that heat generation is prevented. This further improves safety while further reducing power consumption. Since power transmission is stopped when the power transmission stop request has been received from the power-reception-side instrument, power transmission can be reliably stopped. Moreover, the power transmission control device need not detect (determine) whether or not to continue power transmission.

(4) In the power transmission control device, the power transmission stop request may be a full-charge notification from the power reception device.

The power transmission stop request may be a full-charge notification (e.g., full-charge notification frame) relating to a battery of the power-reception-side instrument, for example. Note that the power transmission stop request is not limited thereto. The power transmission stop request may be an operation unnecessary notification that indicates that the operation of a specific circuit of the power-reception-side instrument has become unnecessary.

(5) In the power transmission control device, the power-transmission-side control circuit may cause the power reception device to perform the normal power transmission to the power reception device after the conformity of the power reception device has been authenticated by the ID authentication, may determine the presence or absence of a foreign object during the normal power transmission based on a change in waveform of an induced voltage signal of the primary coil, and may cause the power transmission device to stop the normal power transmission and return to the initial state when a foreign object has been detected.

Normal power transmission starts after ID authentication. The presence or absence of a foreign object (conductive foreign object such as a metal foreign object) is detected during normal power transmission, and the power transmission device stops normal power transmission and returns to the initial state when a foreign object has been detected. Since abnormal heat generation, a skin burn, ignition, or the like may occur when a foreign object is inserted between the primary coil and the secondary coil, measures against a foreign object are important. For example, since the load of the power-reception-side instrument increases when a foreign object is present, the waveform of the induced voltage signal of the primary coil changes. Therefore, a foreign object can be detected using a circuit having a simple configuration by utilizing this principle. The safety and the reliability of the non-contact power transmission system are remarkably improved by taking measures against a foreign object.

(6) In the power transmission control device, the power-transmission-side control circuit may detect whether or not a power-reception-side instrument has been removed based on a change in waveform of an induced voltage signal of the primary coil, and may cause the power transmission device to stop the normal power transmission when the power-transmission-side control circuit has detected that the power-reception-side instrument has been removed during the normal power transmission.

When the power-reception-side instrument has been removed during normal power transmission, the primary coil and the secondary coil are decoupled, so that the mutual inductance due to coupling is lost, and a resonance occurs corresponding to only the inductance of the primary coil. As a result, since the resonance frequency increases and approach the transmission frequency, a current easily flows through the power transmission coil, whereby the load with respect to the power-transmission-side instrument increases (i.e., the induced voltage increases). Specifically, the waveform of the induced voltage signal of the primary coil changes. Therefore, removal of the power-reception-side instrument can be detected using a circuit having a simple configuration by utilizing this principle. Unnecessary power consumption does not occur by detecting removal of the power-reception-side instrument during normal power transmission. Therefore, a reduction in power consumption and improvement in safety and reliability can be achieved.

(7) In the power transmission control device, the power-transmission-side control circuit may detect whether or not a takeover state has occurred, the normal power transmission being continuously performed in the takeover state while erroneously regarding a foreign object placed between the primary coil and the secondary coil as a power-reception-side instrument, and may cause the power transmission device to stop the normal power transmission and return to the initial state when the power-transmission-side control circuit has detected that the takeover state has occurred.

The takeover state is detected during normal power transmission to further improve safety and the reliability of the non-contact power transmission system. The takeover state is considered to be a special form of foreign object insertion. The takeover state refers to a state in which normal power transmission is continuously performed while erroneously regarding a foreign object as the power-reception-side instrument.

For example, when a thin metal sheet has been inserted between the primary coil and the secondary coil to block the primary coil and the secondary coil, since a considerable load is always present with respect to the power-transmission-side instrument, it is difficult to detect removal of the power-reception-side instrument, for example.

Specifically, since the power transmission device detects a load corresponding to the power-reception-side instrument after the power-reception-side instrument has been removed, the power transmission device cannot detect removal of the power-reception-side instrument and cannot stop normal power transmission. In this case, the temperature of the metal sheet may increase to a large extent, whereby abnormal heat generation, ignition, instrument breakdown, a skin burn, or the like may occur. Therefore, a takeover detection function is provided in addition to the foreign object detection function and the removal detection function, and normal power transmission is promptly stopped when the takeover state has been detected. This further improves the safety and the reliability of the non-contact power transmission system.

(8) In the power transmission control device, the power-transmission-side control circuit may detect whether or not the takeover state has occurred by utilizing a phenomenon that a signal transmitted from the power reception device is blocked by the foreign object and does not reach the power transmission device.

When the takeover state has occurred, signal transmission from the power-reception-side instrument to the power-transmission-side instrument is blocked by the foreign object so that the signal cannot reach the power-transmission-side instrument. Whether or not the takeover state has occurred is detected by transmitting a signal from the power-reception-side instrument to the power-transmission-side instrument and determining whether or not the power-transmission-side instrument can detect the signal utilizing this principle.

For example, the power reception device transmits a signal (physical signal) to the power transmission device by means of load modulation through the secondary coil and the primary coil, and whether or not the takeover state has occurred is detected by determining whether or not the power transmission device can detect the signal (physical signal). Note that the takeover state detection method is not limited thereto. For example, a light-emitting means may be provided in the power reception device, and a light-receiving means may be provided in the power transmission device. Whether or not the takeover state has occurred may be detected by determining whether or not the power transmission device can detect light (including infrared light) emitted from the power reception device.

Alternatively, whether or not external light (ambient light) reaches the power transmission device without being blocked by a foreign object may be detected. Whether or not the takeover state has occurred may be detected by determining whether or not the power transmission device can detect sound from the power reception device at a predetermined level instead of utilizing an electrical signal or light.

(9) In the power transmission control device, the power-transmission-side control circuit may detect an intermittent change in load of the power reception device, and may cause the power transmission device to stop the normal power transmission when the power-transmission-side control circuit cannot detect an intermittent change in the load during the normal power transmission.

The power reception device causes the load modulation section to intermittently change the load when ID authentication has completed and normal power transmission is performed (e.g., when charging current is supplied to a battery pack (i.e., battery)).

Since the power reception device intermittently changes the load at a given timing (i.e., a timing known to the power transmission device; a regular timing, for example), the power transmission device can always detect an intermittent change in the load of the power reception device during normal power transmission unless a foreign object is inserted. Therefore, the power transmission device can determine that a foreign object has been inserted when the power transmission device cannot detect an intermittent change in the load of the power reception device.

The load modulation section included in the power reception device is provided to transmit information to the power transmission device. Since the load modulation section is utilized to detect a foreign object, dedicated hardware need not be provided to detect a foreign object. Since the load modulation method is employed as a communication method from the power reception device to the power transmission device, the power transmission device necessarily has a configuration that detects a change in load. The power transmission device can determine whether or not a foreign object has been inserted by merely operating the configuration that detects a change in load during normal power transmission. Therefore, it is unnecessary to provide additional hardware in the power transmission device.

A change in the load of the power reception device can be relatively easily detected by detecting a change in waveform of the induced voltage signal of the primary coil, for example (note that the detection method is not limited thereto). A change in the load of the power reception device can be accurately detected by normal digital signal processing. Since the signal generated due to load modulation is transmitted from the power reception device to the power transmission device utilizing the same path as the path used for normal power transmission (i.e., the path through the primary coil and the secondary coil), a dedicated transmission path for the signal which enables detection of insertion of a foreign object need not be provided.

Therefore, it is possible to accurately detect insertion (takeover) of a relatively large foreign object between the primary coil and the secondary coil by simple signal processing while reducing the number of parts by forming a non-contact power transmission system.

(10) In the power transmission control device,
the load of the power reception device may be changed cyclically during the normal power transmission; and
the power-transmission-side control circuit may cause the power transmission device to stop the normal power transmission when the power-transmission-side control circuit cannot detect a change in the load over a given number of cycles.

In order to carefully detect whether or not the takeover state has occurred, the power-transmission-side control circuit detects a change in the load of the power reception device in cycle units, and stops normal power transmission when the power-transmission-side control circuit cannot detect a change in load over a given number of cycles (e.g., three cycles). This increases the detection accuracy of insertion of a foreign object that causes a takeover, thereby preventing a situation in which the power-transmission-side control circuit erroneously stops normal power transmission when a change in load cannot be detected due to an accidental factor.

(11) According to another embodiment of the invention, there is provided a power transmission device comprising:
one of the above power transmission control devices; and
a power transmission section that generates an alternating-current voltage and supplies the alternating-current voltage to the primary coil.

A novel power transmission device is thus implemented which has a function of performing a basic sequence including a step of performing ID authentication when the switch has been turned ON.

(12) According to another embodiment of the invention, there is provided a non-contact power transmission system comprising a power transmission device and a power reception device, when a switch provided in a power-transmission-side instrument has been turned ON, the non-contact power transmission system performing non-contact power transmission from the power transmission device to the power reception device through a primary coil and a secondary coil that are electromagnetically coupled,
the power transmission device including a power-transmission-side control circuit that controls power transmission to the power reception device based on an induced voltage in the primary coil;
the power reception device including;
a power supply control section that controls power supply to a power-supply-target load: and
a power reception control device that includes a power-reception-side control circuit that controls the power reception device; and
the power-transmission-side control circuit of the power transmission device causing the power transmission device to perform temporary power transmission to the power reception device to enable ID authentication on the power reception device when the switch provided in the power-transmission-side instrument has been turned ON, performing ID authentication based on ID authentication information transmitted from the power reception device that has received the temporary power transmission, causing the power transmission device to perform normal power transmission to the power reception device after the conformity of the power reception device has been authenticated by the ID authentication, and causing the power transmission device to stop the temporary power transmission and return to an initial state that waits for the switch to be turned ON when the ID authentication information from the power reception device has not been received within a given period of time after the temporary power transmission has stated, or the ID authentication has failed.

A novel non-contact power transmission system is thus implemented which performs temporary power transmission and ID authentication when the switch has been turned ON. The non-contact power transmission system according to this embodiment is convenient to the user and exhibits reduced power consumption, high reliability, and excellent safety.

(13) In the non-contact power transmission system,
the power-transmission-side control circuit may cause the power reception device to perform the normal power transmission to the power reception device after the conformity of the power reception device has been authenticated by the ID authentication, may determine the presence or absence of a foreign object during the normal power transmission based on a change in waveform of an induced voltage signal of the primary coil, may cause the power transmission device to stop the normal power transmission and return to the initial state when a foreign object has been detected, and may cause the power transmission device to stop the normal power transmission and return to the initial state when a power transmission stop request from the power reception device has been received after the normal power transmission has started.

According to this embodiment, unnecessary power consumption is prevented while improving reliability and safety by performing a sequence that returns to the initial state when ID authentication has failed or the power transmission stop request has been received.

(14) In the non-contact power transmission system, the power reception device may further include a load modulation section;

the power-reception-side control circuit may cause the load modulation section to regularly operate to perform regular load authentication after the normal power transmission has started; and the power-transmission-side control circuit of the power transmission device may detect a regular change in load of the power reception device, and may cause the power transmission device to stop the normal power transmission when the power-transmission-side control circuit cannot detect a regular change in the load during the normal power transmission.

According to this embodiment, measures when the takeover state has been detected are implemented by regular load authentication after normal power transmission has started. Therefore, the reliability and the safety of the non-contact power transmission system are remarkably improved.

(15) According to another embodiment of the invention, there is provided a non-contact power transmission system comprising a power transmission device and a power reception device, when a switch provided in a power-transmission-side instrument has been turned ON, the non-contact power transmission system performing non-contact power transmission from the power transmission device to the power reception device through a primary coil and a secondary coil that are electromagnetically coupled, the power transmission device including a power-transmission-side control circuit that controls power transmission to the power reception device based on an induced voltage in the primary coil;

the power reception device including:

a load modulation section that modulates a load of the power reception device;

a power supply control section that controls power supply to a power-supply-target load; and a power reception control device that includes a full-charge detection section that detects whether or not the power-supply-target load has been fully charged, and a power-reception-side control circuit that controls the power reception device, the power-reception-side control circuit causing the power reception device to transmit ID authentication information to the power transmission device due to load modulation by the load modulation section when the power reception device has received the temporary power transmission from the power transmission device, causing the power supply control section to supply power to the power-supply-target load when the power reception device has received the normal power transmission from the power transmission device, causing the load modulation section to operate to intermittently change the load of the power reception device in order to detect a takeover state when power is supplied to the power-supply-target load, and transmitting a full-charge notification to the power transmission device due to load modulation by the load modulation section when the hill-charge detection section has detected that the power-supply-target load has been fully charged; and the power-transmission-side control circuit causing the power transmission device to perform the temporary power transmission to the power reception device to enable ID authentication on the power reception device when the switch has been turned ON, performing ID authentication based on the ID authentication information transmitted from the power reception device that has received the temporary power transmission, causing the power transmission device to stop the temporary power transmission and return to an initial state that waits for the switch to be turned ON when the ID authentication information from the power reception device has not been received within a given period of time after the temporary power transmission has started, causing the power transmission device to stop the temporary power transmission and return to the initial state when the ID authentication has failed, causing the power transmission device to perform the normal power transmission to the power reception device after the conformity of the power reception device has been authenticated by the ID authentication, detecting the presence or absence of a foreign object during the normal power transmission based on a change in waveform of an induced voltage signal of the primary coil, detecting whether or not the takeover state has occurred by determining whether or not a signal based on the intermittent load modulation by the power reception device can be detected, and causing the power transmission device to stop the normal power transmission and return to the initial state when a foreign object or the takeover state has been detected or it has been detected that the power-supply-target load of the power reception device has been fully charged.

The non-contact power transmission system according to this embodiment performs temporary power transmission when the switch has been turned ON, performs normal power transmission after ID authentication, detects the presence or absence of a foreign object detection during normal power transmission, detects whether or not the takeover state has occurred by utilizing intermittent load modulation of the power-reception-side instrument, detects the full-charge notification, and stops power transmission and returns to the initial state (switch ON wait state) based on the detection result. This significantly power consumption and further improves safety and reliability.

(16) In the non-contact power transmission system, when the power-reception-side control circuit causes the load of the power reception device to be intermittently changed during the normal power transmission, the power-reception-side control circuit may perform a load reduction process that reduces a load state of the power-supply-target load by causing the power supply control section to reduce power supplied to the power-supply-target load.

In the non-contact power transmission system according to this embodiment, when the power reception device reduces the load state of the power-supply-target load (e.g., battery) while performing intermittent load modulation. When performing load modulation for detecting the takeover state without stopping power transmission to the power-supply-target load (battery), transmission of the signal due to load modulation to the power transmission device is always affected by the state of power supply to the load (battery) (i.e., the load state of the battery).

For example, the load state of the load is heavy when a large amount of charging current is supplied to the power-supply-target load (e.g., battery: battery pack or the like). In this case, even if a small current is turned ON/OFF by causing a load modulation transistor to be turned ON/OFF for load modulation, the amount of ON/OFF current is smaller than the amount of charging current of the load (battery). Therefore, it is difficult for the power transmission device to detect a change in load due to load modulation.

According to this embodiment, the power reception device monitors the load state of the power-supply-target load (e.g., battery: battery pack or the like) during normal power transmission, and, when the power reception device performs load modulation that enables detection of the takeover state, the power reception device optionally (or uniformly) reduces (or temporarily stops) power supplied to the load (battery). Since the load state of the load (battery) is apparently reduced by reducing power supplied to the load (battery), the power transmission device can easily detect the signal due to load modulation. Therefore, the foreign object detection accuracy is maintained at a desired level even when the load (battery) is heavy.

Moreover, a problem in which an electronic circuit included in the load cannot operate does not occur even if the load (battery) is reduced.

Since load modulation that enables detection of insertion of a foreign object is intermittently performed at appropriate intervals taking the effect on power supplied to the load (battery) into consideration, as stated above, power supply to the load (battery) is not adversely affected even if the load is reduced. For example, a problem in which the charging time of the battery pack increases to a large extent does not occur.

The load change detection accuracy of the power transmission device can be maintained at a desired level, even when the load (battery) is heavy, by causing the power reception device to monitor the load state of the power-supply-target load (battery) and reduce the load state of the load (battery) when performing load modulation that enables detection of insertion of the takeover state.

(17) According to another embodiment of the invention, there is provided an electronic instrument comprising:
a switch that causes power transmission to start or stop; and
the above power transmission device.

This makes it possible to provide a high-performance electronic instrument with low power consumption and improved safety and reliability.

Preferred embodiments of the invention are described below with reference to the drawings. Note that the following embodiments do not in any way limit the scope of the invention defined by the claims laid out herein. Note that all elements of the following embodiments should not necessarily be taken as essential requirements for the invention.

First Embodiment

Examples of an electronic instrument to which the invention is suitably applied and the principle of non-contact power transmission technology are described below.

Figure 1B:
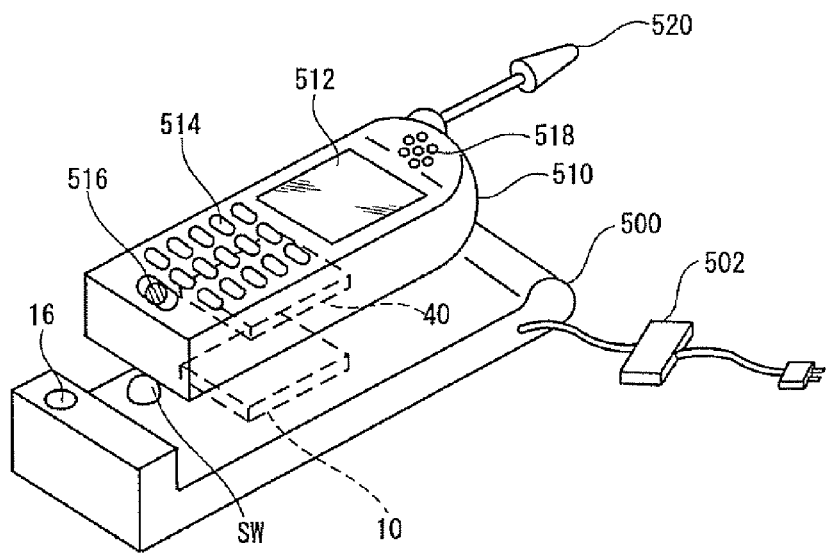
Figure 1C:
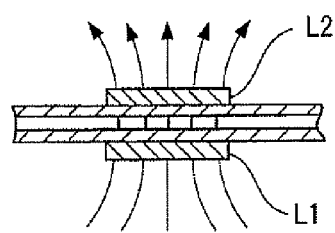

Examples of Electronic Instrument and Principle of Non-Contact Power Transmission FIGS. 1A to 1C are views illustrative of examples of an electronic instrument compliant with non-contact power transmission and the principle of non-contact power transmission using an induction transformer As shown in FIGS. 1A and 1B, a charger (cradle) 500 (i.e., power-transmission-side electronic instrument) includes a power transmission device (e.g., power transmission module including a power-transmission-side control circuit (power-transmission-side control IC)) 10.

The charger (cradle) 500 also includes a switch (SW) that causes (triggers) power transmission to start or stop, and a display section (e.g., LED) 16 that is turned ON when the charger transmits power (operates).

In the charger (cradle) 500 shown in FIG. 1A, the switch (SW) is provided outside an area in which a power-reception-side electronic instrument (portable telephone) 510 is placed.

When the user who desires to charge the portable telephone 510 has pressed the switch (SW) with the finger, the power transmission device 10 starts power transmission (temporary power transmission for position detection and ID authentication: described later). When the switch (SW) has been pressed during power transmission (including temporary power transmission and normal power transmission), power transmission is necessarily stopped.

As the switch (SW), a mechanical momentary switch may be used, for example. Note that the switch (SW) is not limited thereto Various switches such as a relay switch and a magnet switch may also be used.

In the charger (cradle) 500 shown in FIG. 1B, the switch (SW) is provided inside an area in which the power-reception-side electronic instrument (portable telephone) 510 is placed. Therefore, when the portable telephone 510 is placed on the charger (cradle) 500, the switch (SW) is automatically pressed (turned ON) due to the weight of the charger (cradle) 500. This causes the charger (cradle) 500 to start power transmission (temporary power transmission for position detection and ID authentication: described later).

When the switch (SW) has been pressed during power transmission (including temporary power transmission and normal power transmission) (e.g., when the portable telephone 510 has been removed from the charger (cradle) 500 and then placed on the charger (cradle) 500 so that the switch (SW) has been pressed again), power transmission is necessarily stopped.

In FIG. 1B, the switch (SW) causes power transmission to start in the same manner as in FIG. 1A, but is not used to detect the presence of the portable telephone 510 (removal of the portable telephone 510 is basically determined based on an induced voltage in a primary coil: described later).

Note that the switch (SW) may also have a function of detecting the presence of the portable telephone 510.

The portable telephone 510 (i.e., power-reception-side electronic instrument) includes a power reception device (e.g., power transmission module including a power-reception-side control circuit (power-reception-side control IC)) 40. The portable telephone 510 also includes a display section 512 (e.g., LCD), an operation section 514 that includes a button or the like, a microphone 516 (sound input section), a speaker 518 (sound output section), and an antenna 520.

Power is supplied to the charger 500 through an AC adaptor 502. The power is transmitted from the power transmission device 10 to the power reception device 40 by means of non-contact power transmission. This makes it possible to charge a battery of the portable telephone 510 or operate a device provided in the portable telephone 510.

As schematically shown in FIG. 1C, power transmission from the power transmission device 10 to the power reception device 40 is implemented by electromagnetically coupling a primary coil L1 (power-transmission-side coil) provided in the power transmission device 10 and a secondary coil L2 (power-reception-side coil) provided in the power reception device 40 to form a power transmission transformer. This enables non-contact power transmission.

Note that the electronic instrument to which this embodiment is applied is not limited to the portable telephone 510. For example, this embodiment may be applied to various electronic instruments such as a wristwatch, a cordless telephone, a shaver, an electric toothbrush, a wrist computer, a handy terminal, a portable information terminal, and a power-assisted bicycle.

Examples of particularly suitable electronic instruments include a portable terminal (including a portable telephone terminal, PDA terminal, and portable personal computer terminal) and a watch. Since the power reception device according to the invention has a simple configuration and a reduced size, the power reception device can be incorporated in a portable terminal or the like. The charging time of a secondary battery provided in an electronic instrument can be reduced using the power reception device according to the invention due to low loss. Moreover, since the power reception device according to the invention reduces heat generation, the reliability of an electronic instrument increases from the viewpoint of safety.

In particular, since a large amount of charging current flows through a portable terminal (including a portable telephone terminal, PDA terminal, and portable personal computer terminal) under heavy load, heat may be generated to a large extent. Therefore, the features of the invention (i.e., low loss and low heat generation) can be sufficiently utilized for such a portable terminal.

Since the power transmission device 10 provided in the charger (cradle) 500 shown in FIGS. 1A and 1B starts power transmission when the switch (SW) has been turned ON, unnecessary power consumption can be prevented.

Since the power transmission device 10 stops power transmission when the power transmission device 10 has received a full-charge notification from the power reception device 40 and returns to a state (initial state) in which the power transmission device 10 waits for the switch (SW) to be turned ON, unnecessary power consumption can also be prevented.

Therefore, the power transmission device 10 shown in FIGS. 1A and 1B can further reduce power consumption.

Configuration examples of power transmission device and power reception device

Figure 2:
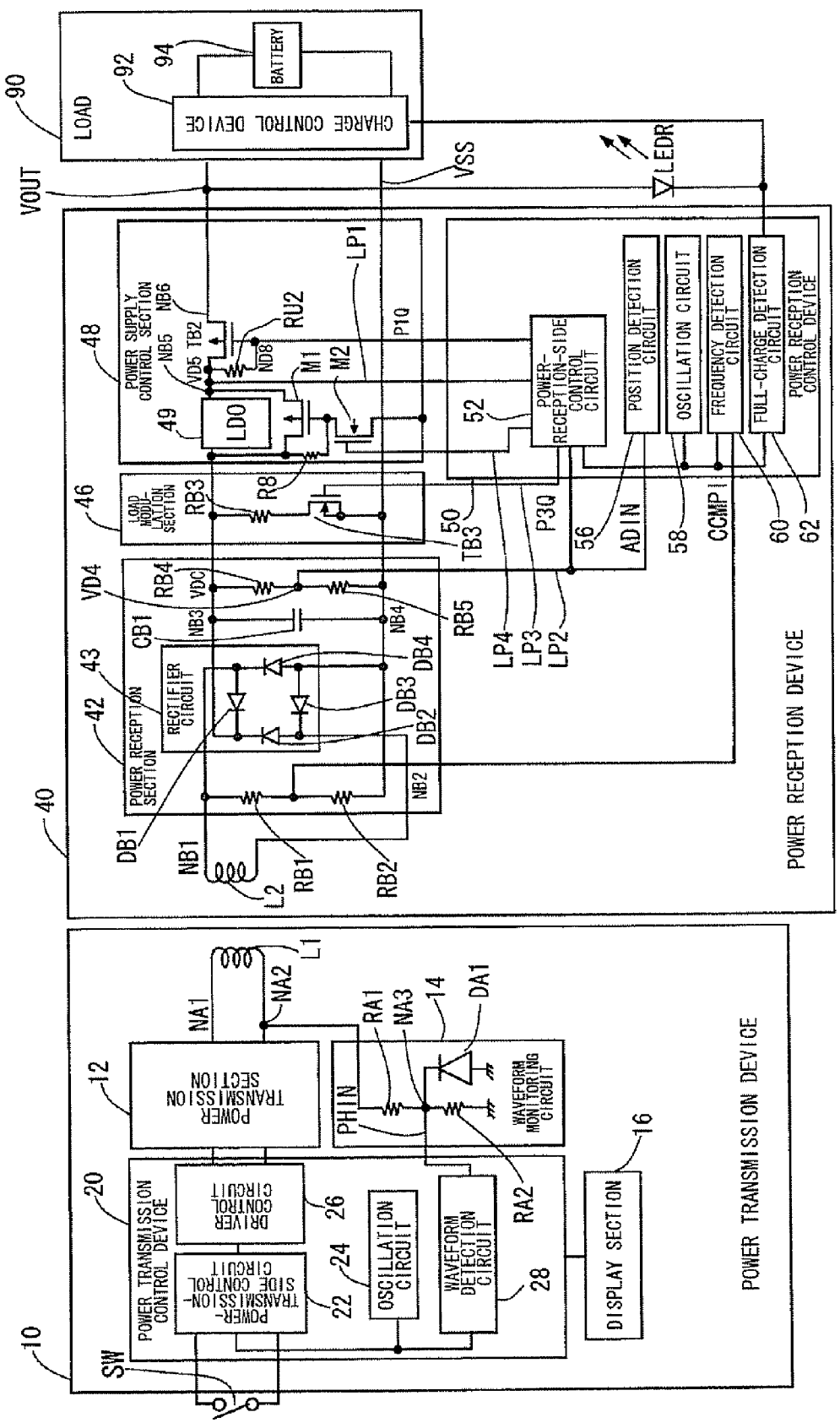
FIG. 2 is a circuit diagram showing an example of a specific configuration of each section of a non-contact power transmission system that includes a power transmission device and a power reception device.

FIG. 2 is a circuit diagram showing an example of a specific configuration of each section of a non-contact power transmission system that includes the power transmission device and the power reception device.

As shown in FIG. 2, the power transmission device 10 includes a power transmission control device 20, a power transmission section 12, and a waveform monitoring circuit 14. The power transmission control device 20 includes a power-transmission-side control circuit 22, an oscillation circuit 24, a driver control circuit 26, and a waveform detection circuit 28.

The power reception device 40 includes a power reception section 42, a load modulation section 46, and a power supply control section 48. A load 90 (i.e., power-supply-target load) includes a charge control device 92 and a battery (secondary battery) 94. The details are described below.

A power-transmission-side electronic instrument such as the charger 500 includes at least the power transmission device 10 shown in FIG. 2. A power-reception-side electronic instrument such as the portable telephone 510 includes at least the power reception device 40 and the power-supply-target load 90.

The configuration shown in FIG. 2 implements a non-contact power transmission (contactless power transmission) system that transmits power from the power transmission device 10 to the power reception device 40 by electromagnetically coupling the primary coil L1 and the secondary coil L2, and supplies power (voltage VOUT) to the load 90 from a voltage output node NB6 of the power reception device 40.

The power transmission device 10 (power transmission module or primary module) may include the primary coil L1, the power transmission section 12, the waveform monitoring circuit 14, a display section 16, and the power transmission control device 20. The power transmission device 10 and the power transmission control device 20 are not limited to the configuration shown in FIG. 2. Various modifications may be made such as omitting some elements (e.g., display section and waveform monitoring circuit), adding other elements, or changing the connection relationship.

The power transmission section 12 generates an alternating-current voltage at a given frequency during power transmission, and generates an alternating-current voltage at a frequency which differs depending on data during data transfer. The power transmission section 12 supplies the generated alternating-current voltage to the primary coil L1.

Figure 3A:
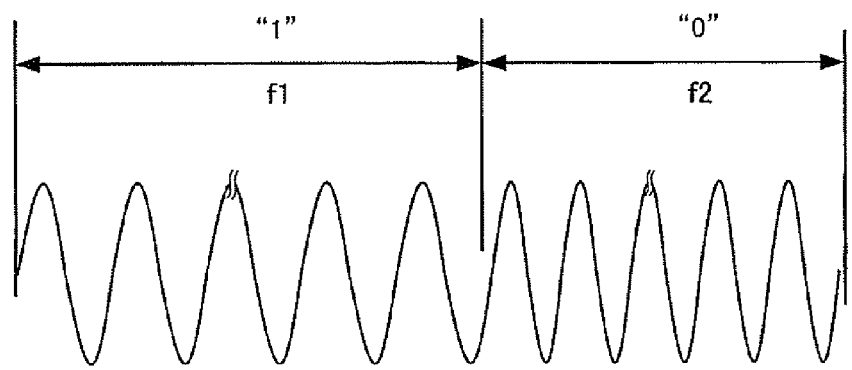
FIGS. 3A and 3B are views illustrative of the principle of information transmission between a primary-side instrument and a secondary-side instrument.
Figure 3B:
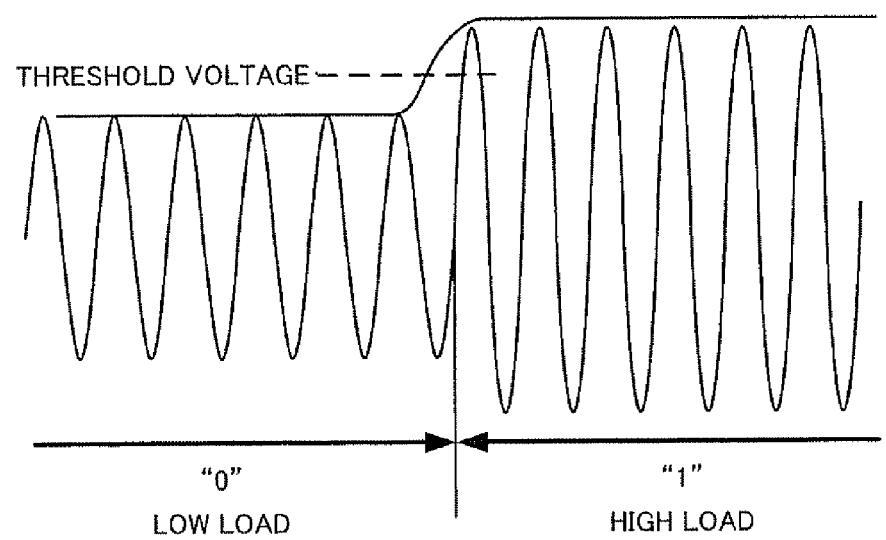

FIGS. 3A and 3B are views illustrative of the principle of information transmission between a primary-side instrument and a secondary-side instrument. Information is transmitted from the primary-side instrument to the secondary-side instrument utilizing frequency modulation. Information is transmitted from the secondary-side instrument to the primary-side instrument utilizing load modulation.

As shown in the FIG. 3A, the power transmission device 10 generates an alternating-current voltage at a frequency f1 when transmitting data "1" to the power reception device 40, and generates an alternating-current voltage at a frequency f2 when transmitting data "0" to the power reception device 40, for example. As shown in FIG. 3B, the power reception device 40 can switch the load state between a low-load state and a high-load state by load modulation to transmit data "0" or "1" to the primary-side instrument (power transmission device 10).

The power transmission section 12 shown in FIG. 2 may include a first power transmission driver that drives one end of the primary coil L1, a second power transmission driver that drives the other end of the primary coil L1, and at least one capacitor that forms a resonant circuit with the primary coil L1. Each of the first and second power transmission drivers included in the power transmission section 12 is an inverter circuit (or buffer circuit) that includes a power MOS transistor, for example, and is controlled by the driver control circuit 26 of the power transmission control device 20.

The primary coil L1 (power-transmission-side coil) is electromagnetically coupled with the secondary coil L2 (power-reception-side coil) to form a power transmission transformer. For example, when power transmission is necessary, the portable telephone 510 is placed on the charger 500 so that a magnetic flux of the primary coil L1 passes through the secondary coil L2, as shown in FIG. 1. When power transmission is unnecessary, the charger 500 and the portable telephone 510 are physically separated so that a magnetic flux of the primary coil L1 does not pass through the secondary coil L2.

As the primary coil L1 and the secondary coil L2, a planar coil formed by spirally winding an insulated wire in a single plane may be used, for example. Note that a planar coil formed by spirally winding a twisted wire (i.e., a wire obtained by twisting a plurality of insulated thin wires) may also be used.

The waveform monitoring circuit 14 is a circuit that detects an induced voltage in the primary coil L1. The waveform monitoring circuit 14 includes resistors RA1 and RA2 and a diode DA1 provided between a connection node NA3 of the resistors RA1 and RA2 and a power supply GND (low-potential-side power supply in a broad sense), for example. Specifically, a signal PHIN obtained by dividing the induced voltage in the primary coil L1 using the resistors RA1 and RA2 is input to the waveform detection circuit 28 of the power transmission control device 20.

The display section 16 displays the state (e.g., power transmission or ID authentication) of the non-contact power transmission system using a color, an image, or the like. The display section 16 is implemented by a light-emitting diode (LED), a liquid crystal display (LCD), or the like.

The power transmission control device 20 controls the power transmission device 10. The power transmission control device 20 may be implemented by an integrated circuit device (IC) or the like. The power transmission control device 20 includes the power-transmission-side control circuit 22, the oscillation circuit 24, the driver control circuit 26, and the waveform detection circuit 28.

The power-transmission-side control circuit 22 controls the power transmission device 10 and the power transmission control device 20. The power-transmission-side control circuit 22 may be implemented by a gate array, a microcomputer, or the like.

Specifically, the power-transmission-side control circuit 22 performs sequence control and a determination process necessary for power transmission, load detection, frequency modulation, foreign object detection, removal (detachment) detection, and the like. The power-transmission-side control circuit 22 starts temporary power transmission for position detection and ID authentication targeted at the power reception device 40 when the switch (SW) has been turned ON (described later).

The oscillation circuit 24 includes a crystal oscillation circuit or the like, and generates a primary-side clock signal. The driver control circuit 26 generates a control signal at a desired frequency based on the clock signal generated by the oscillation circuit 24, a frequency setting signal output from the control circuit 22, and the like, and outputs the generated control signal to the power transmission drivers (not shown) of the power transmission section 12 to control the operations of the power transmission drivers.

The waveform detection circuit 28 monitors the waveform of the signal PHIN that corresponds to an induced voltage at one end of the primary coil L1, and performs load detection, foreign object detection, and the like. For example, when the load modulation section 46 of the power reception device 40 has performed load modulation for transmitting data to the power transmission device 10, the signal waveform of the induced voltage in the primary coil L1 chances correspondingly.

As shown in FIG. 3B, the amplitude (peak voltage) of the signal waveform decreases when the load modulation section 46 of the power reception device 40 reduces load in order to transmit data "0", and the amplitude of the signal waveform increases when the load modulation section 46 increases load in order to transmit data "1". Therefore, the waveform detection circuit 28 can determine whether the data transmitted from the power reception device 40 is "0" or "1" by determining whether or not the peak voltage has exceeded a threshold voltage by performing a peak-hold process on the signal waveform of the induced voltage, for example. Note that the waveform detection method is not limited to the above-described method. For example, the waveform detection circuit 28 may determine whether the power-reception-side load has increased or decreased using a physical quantity other than the peak voltage.

The power reception device 40 (power reception module or secondary module) may include the secondary coil L2, the power reception section 42, the load modulation section 46, the power supply control section 48, and a power reception control device 50. Note that the power reception device 40 and the power reception control device 50 are not limited to the configuration shown in FIG. 2. Various modifications may be made such as omitting some elements, adding other elements, or changing the connection relationship.

The power reception section 42 converts an alternating-current induced voltage in the secondary coil L2 into a direct-current voltage. A rectifier circuit 43 included in the power reception section 42 converts the alternating-current induced voltage. The rectifier circuit 43 includes diodes DB1 to DB4. The diode DB1 is provided between a node NB1 at one end of the secondary coil L2 and a node NB3 (direct-current voltage VDC generation node). The diode DB2 is provided between the node NB3 and a node NB2 at the other end of the secondary coil L2. The diode DB3 is provided between the node NB2 and a node NB4 (VSS). The diode DB4 is provided between the nodes NB4 and NB1.

Resistors RB1 and RB2 of the power reception section 42 are provided between the nodes NB1 and NB4. A signal CCMPI obtained by dividing the voltage between the nodes NB1 and NB4 using the resistors RB1 and RB2 is input to a frequency detection circuit 60 of the power reception control device 50.

A capacitor CB1 and resistors RB4 and RB5 of the power reception section 42 are provided between the node NB3 (direct-current voltage VDC) and the node NB4 (VSS). A signal VD4 obtained by dividing the voltage between the nodes NB3 and NB4 using the resistors RB4 and RB5 is input to a power-reception-side control circuit 52 and a position detection circuit 56 through a signal line LP2. The divided voltage VD4 is input to the position detection circuit 56 as a frequency detection signal input (ADIN).

The load modulation section 46 performs a load modulation process. Specifically, when the power reception device 40 transmits desired data to the power transmission device 10, the load modulation section 46 variably changes the load of the load modulation section 46 (secondary side) depending on the transmission target data to change the signal waveform of the induced voltage in the primary coil L1. The load modulation section 46 includes a resistor RB3 and a transistor TB3 (N-type CMOS transistor) provided in series between the nodes NB3 and NB4.

The transistor TB3 is ON/OFF-controlled based on a control signal P3Q supplied from the power-reception-side control circuit 52 of the power reception control device 50 through a signal line LP3. When performing the load modulation process by ON/OFF-controlling the transistor TB3 and transmitting a signal to the power transmission device in an authentication stage before normal power transmission starts, a transistor TB2 of the power supply control section 48 is turned OFF so that the load 90 is not electrically connected to the power reception device 40.

For example, when reducing the secondary-side load (high impedance) in order to transmit data "0", the signal P3Q is set at the L level so that the transistor TB3 is turned OFF. As a result, the load of the load modulation section 46 becomes almost infinite (no load). On the other hand, when increasing the secondary-side load (low impedance) in order to transmit data "1", the signal P3Q is set at the H level so that the transistor TB3 is turned ON. As a result, the load of the load modulation section 46 becomes equivalent to the resistor RB3 (high load). The load of the power reception device 40 can thus be ON/OFF-modulated.

The power supply control section 48 controls power supply to the load 90. A regulator (LDO) 49 regulates the voltage level of the direct-current voltage VDC obtained by conversion by the rectifier circuit 43 to generate a power supply voltage VD5 (e.g., 5 V). The power reception control device 50 operates based on the power supply voltage VD5 supplied from the power supply control section 48, for example.

A switch circuit formed using a PMOS transistor (M1) is provided between the input terminal and the output terminal of the regulator (LDO) 49. A path that bypasses the regulator (LDO) 49 is formed by causing the PMOS transistor (M1) as the switch circuit to be turned ON. For example, since a power loss increases due to the equivalent impedance of the regulator 49 and heat generation increases under heavy load (e.g., when it is necessary to cause an almost constant large current to steadily flow in the initial stage of charging a secondary battery which has been exhausted to a large extent), a current is supplied to the load through a path that bypasses the regulator.

An NMOS transistor (M2) and a pull-up resistor R8 that function as a bypass control circuit are provided to ON/OFF-control the PMOS transistor (M1) as the switch circuit.

The NMOS transistor (M2) is turned ON when a high-level control signal is supplied to the gate of the NMOS transistor (M2) through a signal line LP4. This causes the gate of the PMOS transistor (M1) to be set at a low level so that the PMOS transistor (M1) is turned ON, whereby a path that bypasses the regulator (LDO) 49 is formed. When the NMOS transistor (M2) is turned OFF, the gate of the PMOS transistor (M1) is maintained at a high level through the pull-up resistor RS. Therefore, the PMOS transistor (M1) is turned OFF so that the bypass path is not formed.

The NMOS transistor (M2) is ON/OFF-controlled by the power-reception-side control circuit 52 included in the power reception control device 50.

The transistor TB2 (P-type CMOS transistor) is provided between a power supply voltage (VD5) generation node NB5 (output node of the regulator 49) and the node NB6 (voltage output node of the power reception device 40), and is controlled based on a signal P1Q output from the power-reception-side control circuit 52 of the power reception control device 30. Specifically, the transistor TB2 is turned ON when ID authentication has been completed (established) and normal power transmission is performed.

A pull-up resistor RU2 is provided between the power supply voltage generation node NB5 and a node NB8 of the gate of the transistor TB2.

The power reception control device 50 controls the power reception device 40. The power reception control device 50 may be implemented by an integrated circuit device (IC) or the like. The power reception control device 50 may operate based on the power supply voltage VD5 generated based on the induced voltage in the secondary coil L2. The power reception control device 50 may include the (power-reception-side) control circuit 52, the position detection circuit 56, an oscillation circuit 58, the frequency detection circuit 60, and a full-charge detection circuit 62.

The power-reception-side control circuit 52 controls the power reception device 40 and the power reception control device 50. The power-reception-side control circuit 52 may be implemented by a gate array, a microcomputer, or the like. The power-reception-side control circuit 52 operates based on a constant voltage (VD5) at the output terminal of the series regulator (LDO) 49 as a power supply voltage. The power supply voltage (VD5) is supplied to the power-reception-side control circuit 52 through a power supply line LP1.

The power-reception-side control circuit 52 performs sequence control and a determination process necessary for ID authentication, position detection, frequency detection, full-charge detection, load modulation for authentication communication, load modulation for communication that enables foreign object insertion detection, and the like.

The position detection circuit 56 monitors the waveform of the signal ADIN which corresponds to the waveform of the induced voltage in the secondary coil L2, and determines whether or not the positional relationship between the primary coil L1 and the secondary coil L2 is appropriate.

Specifically, the position detection circuit 56 converts the signal ADIN into a binary value using a comparator, and determines whether or not the positional relationship between the primary coil L1 and the secondary coil L2 is appropriate.

The oscillation circuit 58 includes a CR oscillation circuit or the like, and generates a secondary-side clock signal. The frequency detection circuit 60 detects the frequency (f1 or f2) of the signal CCMPI, and determines whether the data transmitted from the power transmission device 10 is "1" or "0".

The full-charge detection circuit 62 (charge detection circuit) detects whether or not the battery 94 of the load 90 has been fully charged (charged). Specifically, the full-charge detection circuit 62 detects the full-charge state by detecting whether a light-emitting device LEDR used to indicate the charge state is turned ON or OFF, for example. The full-charge detection circuit 62 determines that the battery 94 has been fully charged (charging has been completed) when the light-emitting device LEDR has been turned OFF for a given period of time (e.g., five seconds).

The charge control device 92 of the load 90 also detects the full-charge state based on the ON/OFF state of the light-emitting device LEDR.

The power-supply-target load 90 may include the battery 94 and the charge control device 92 that controls charging of the battery 94 and the like. The charge control device 92 detects the full-charge state based on the ON/OFF state of the light-emitting device (LEDR). The charge control device 92 (charge control IC) may be implemented by an integrated circuit device or the like. The battery 94 may be provided with the function of the charge control device 92 (e.g., smart battery). The power-supply-target load 90 is not limited to a secondary battery (battery). For example, a given circuit may serve as the power-supply-target load 90 when the circuit operates.

Outline of Operation of Power Transmission Device

Figure 4:
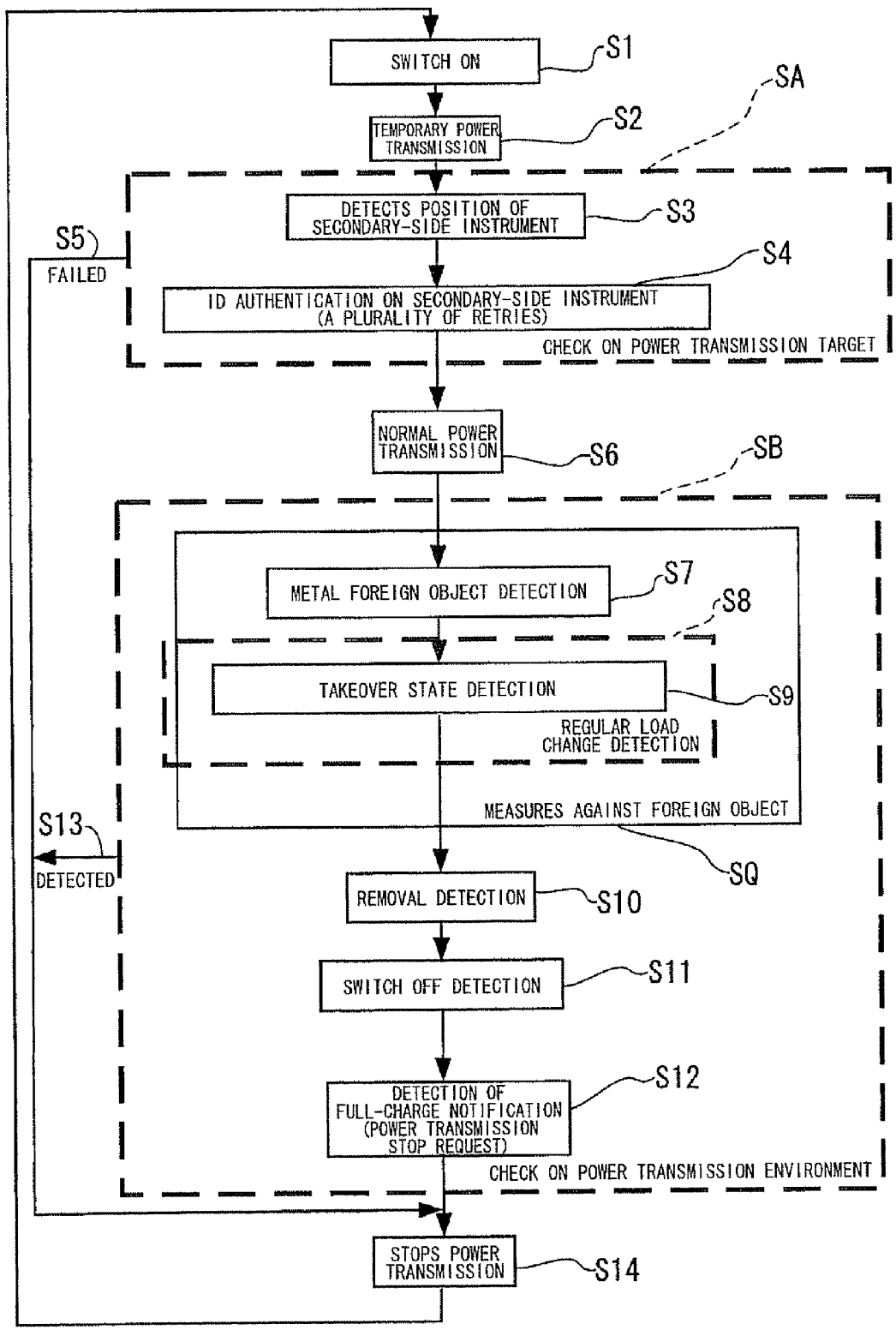
FIG. 4 is a flowchart showing an outline of an example of the operation of a power transmission device.

FIG. 4 is a flowchart showing an outline of an example of the operation of the power transmission device. The operation of the power transmission device 10 is roughly divided into a check on the power transmission target before power transmission (step SA) and a check on the power transmission environment during power transmission (including before power transmission) (step SB) (these steps are enclosed by bold dotted lines).

The power transmission device 10 starts temporary power transmission when the switch (SW) has been turned ON, as described above (steps S1 and S2).

The power transmission device 10 then checks whether or not the power-reception-side instrument (510) is placed at an appropriate position (step S3), and performs ID authentication on the power-reception-side instrument 510 (power reception device 40) to determine whether or not the power-reception-side instrument 510 is an appropriate power transmission target (step S4). A situation in which the user must again turn ON the switch (SW) due to an accidental error in ID authentication is prevented by allowing retries during ID authentication. This improves convenience to the user.

When the power transmission device 10 has failed in position detection or ID authentication (step S5), the power transmission device 10 stops temporary power transmission, and returns to the initial state in which the power transmission device 10 waits for the switch to be turned ON (i.e., a state in which the power transmission device 10 waits for the step S1 to occur).

The position detection circuit 56 included in the power reception device 40 shown in FIG. 2 checks whether or not the power-reception-side instrument is placed at an appropriate position (position detection) based on a direct-current voltage (ADIN) obtained by rectifying the induced voltage in the secondary coil (L2).

Figure 10:
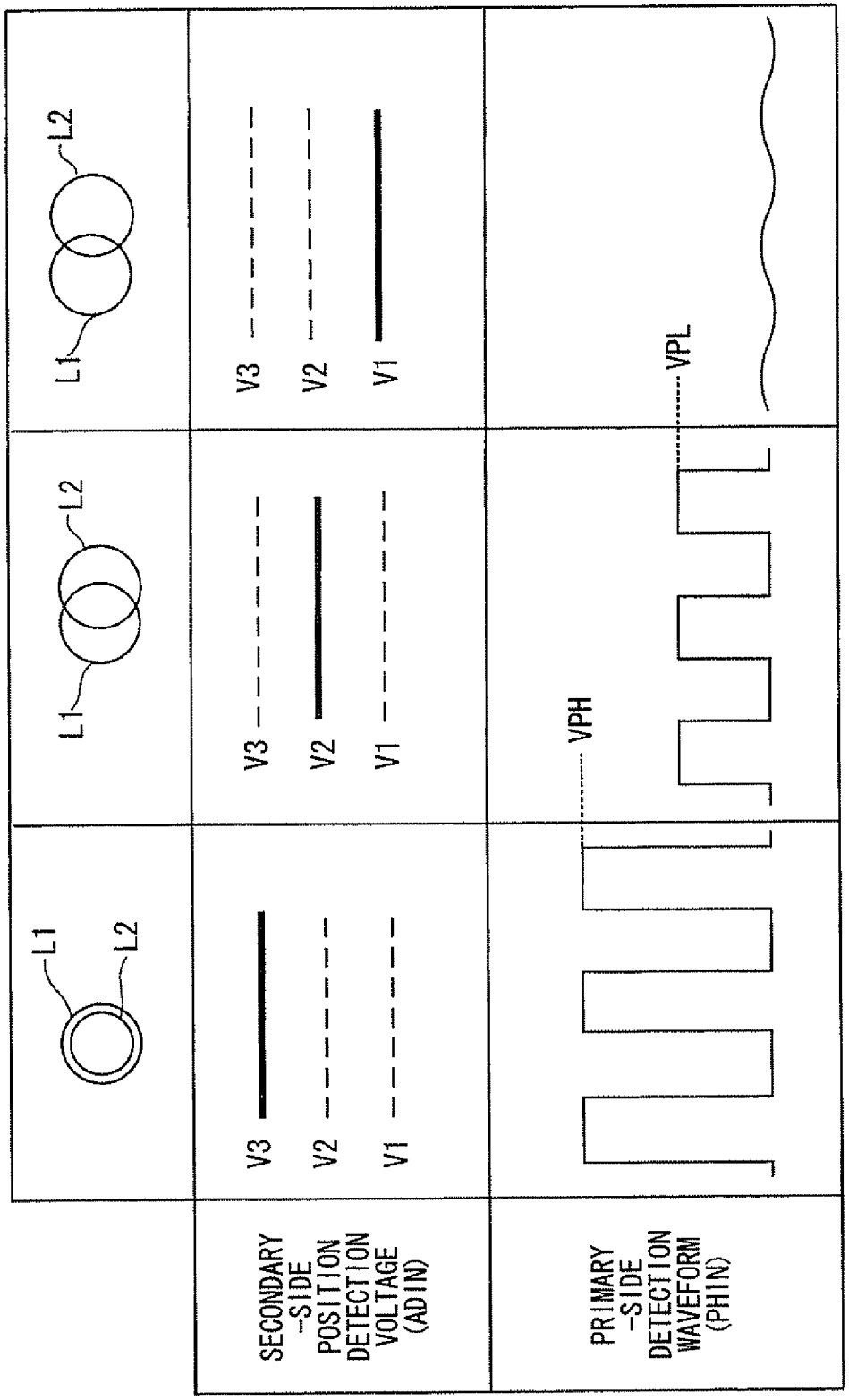
FIG. 10 is a view illustrative of the principle of position detection.
Figure 11C:
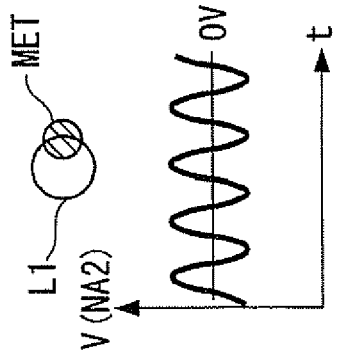
FIGS. 11A to 11F are views illustrative of the principle of metal foreign object (conductive foreign object) detection.
Figure 11F:
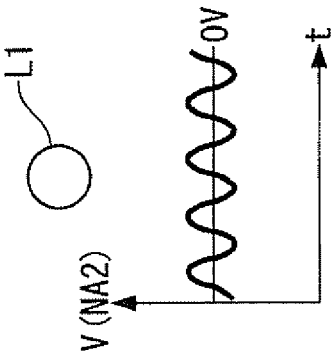
Figure 11B:
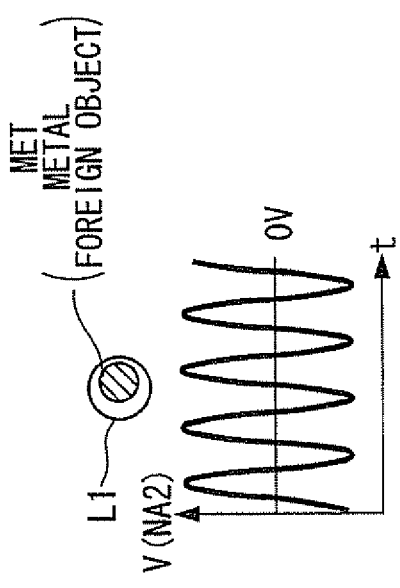
Figure 11E:
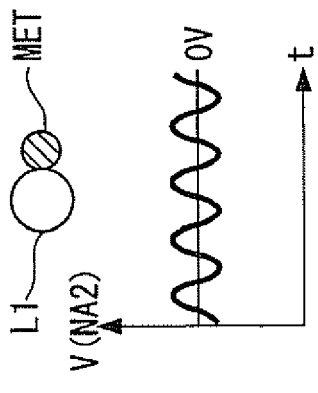
Figure 11A:
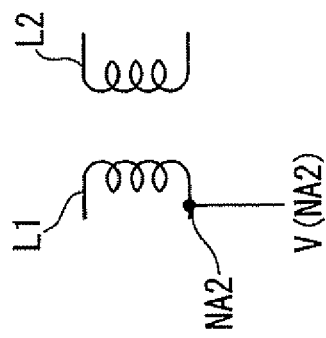
Figure 11D:
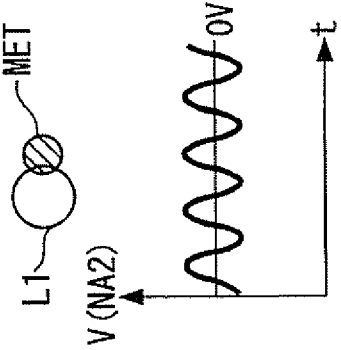

FIG. 10 is a view illustrative of the principle of position detection. As shown in FIG. 10, the waveform (peak value) of the signal PHIN and the voltage level of the signal ADIN change corresponding to the positional relationship between the primary coil (L1) and the secondary coil (L2).

For example, when performing position detection based on the signal ADIN, a direct-current voltage (ADIN) at a given level (V3 level) cannot be obtained when the power-reception-side instrument is placed at an inappropriate position (i.e. the power-reception-side instrument is determined to be placed at an inappropriate position). The position detection result may be transmitted from the power-reception-side instrument to the power-transmission-side instrument utilizing load modulation, for example. The power-reception-side instrument may notify the power-transmission-side instrument that the power-reception-side instrument is placed at an inappropriate position by not transmitting ID authentication information to the power-transmission-side instrument within a given period of time after receiving temporary power transmission.

Again referring to FIG. 4, the power transmission device 10 starts normal power transmission (charge power transmission) after ID authentication (step S6). The power transmission device 10 detects whether or not a metal foreign object is present (metal foreign object detection) (step S7), and detects whether or not a takeover state has occurred (takeover state detection) by means of regular load change detection (steps S8 and S9). The power transmission device 10 detects whether or not the power-reception-side instrument has been removed (leave detection) (step S10), detects whether or not the switch has been turned OFF (switch OFF detection) (step S11), and detects whether or not a full-charge notification (power transmission stop request) has been received (full-charge notification detection) (step S12). When the power transmission device 10 has detected one of the above-mentioned states (step S13), the power transmission device 10 stops normal power transmission (step S14), and returns to the initial state (i.e., a state in which the power transmission device 10 waits for the step S1 to occur).

Whether or not a metal foreign object is present (step S7) and whether or not a takeover state has occurred (step S10) may be detected based on a change in waveform of an induced voltage signal of the primary coil (L1). FIGS. 11A to 11F are views illustrative of the principle of metal foreign object (conductive foreign object) detection. FIGS. 11B to 11F show changes in an induced voltage signal (V(NA2)) of the primary coil (L1) shown in FIG. 11A corresponding to the relative position between the primary coil and a metal foreign object MET (small or medium-sized conductive foreign object).

As shown in FIGS. 11B to 11F, the waveform (amplitude) of the induced voltage signal V(NA2) when the metal foreign object MET is absent (FIG. 11F) differs from the waveform (amplitude) of the induced voltage signal V(NA2) when the metal foreign object (MET) is present (FIGS. 11B to 11E). Therefore, the presence or absence of the metal foreign object (MET) can be detected by monitoring the waveform of the induced voltage signal V(NA2) of the primary coil (L1) using the waveform monitoring circuit 14 (see FIG. 2).

The waveform may be monitored by monitoring the amplitude, the phase of current or voltage, or the like.

Figure 12A:
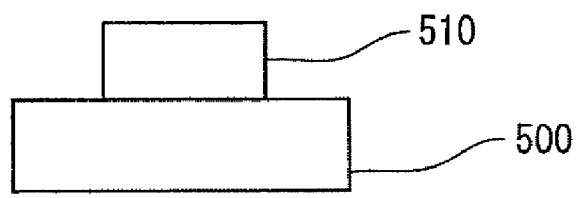
FIGS. 12A to 12D are views illustrative of the principle of removal (leave) detection.
Figure 12B:
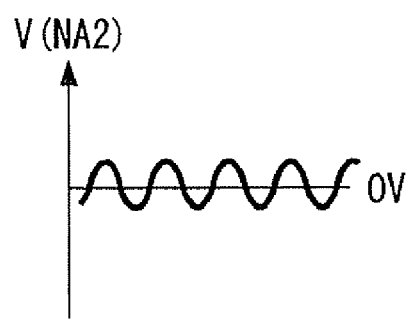
Figure 12C:
Figure 12D:
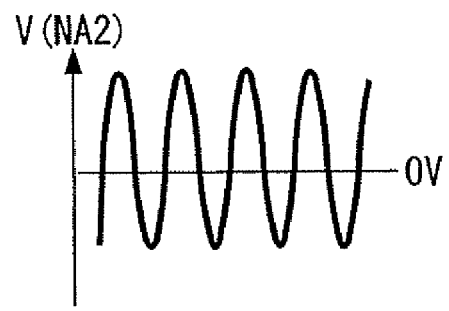

FIGS. 12A to 12D are views illustrative of the principle of removal (leave) detection. When the power-reception-side instrument 510 is placed as shown in FIG. 12A, the induced voltage signal V(NA2) of the primary coil (L1) has a waveform shown in FIG. 12B. When the power-reception-side instrument 510 has been removed as shown in FIG. 12C the induced voltage signal V(NA2) of the primary coil (L1) has a waveform shown in FIG. 12D. The waveform (amplitude) shown in FIG. 12D clearly differs from the waveform shown in FIG. 12B. Therefore, whether or not the power-reception-side instrument has been removed can be detected by monitoring the waveform of the induced voltage signal V(NA2) of the primary coil (L1) using the waveform monitoring circuit 14 (see FIG. 2).

Whether or not a takeover state has occurred may be detected (step S9 in FIG. 4) by determining whether or not the power-transmission-side instrument can detect an intermittent (e.g., regular) load modulation signal from the power-reception-side instrument (described later with reference to FIGS. 13 to 17).

Example of Configuration of Power-Transmission-Side Control Circuit

Figure 5:
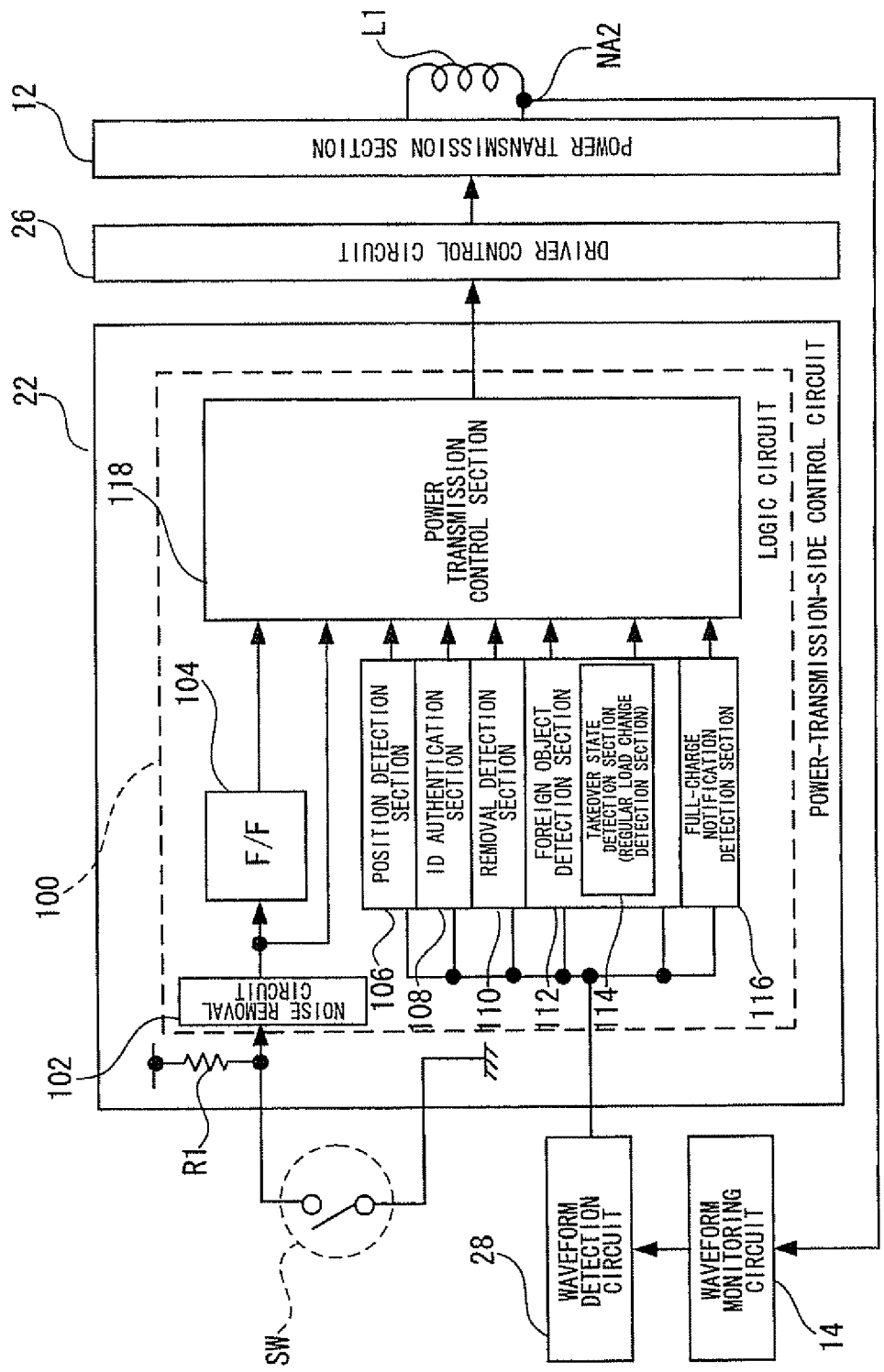
FIG. 5 is a circuit diagram showing an example of the configuration of a power-transmission-side control circuit.

FIG. 5 is a circuit diagram showing an example of the configuration of the power-transmission-side control circuit. As shown in FIG. 5, the power-transmission-side control circuit 22 includes a logic circuit 100.

The logic circuit 100 includes a noise removal circuit 102 that removes noise which occurs when the switch SW is turned ON/OFF, a flip-flop (F/F) 104 that stores whether the present state is the power transmission state or the initial state, a position detection section 106, an ID authentication section 108, a removal (leave) detection section 110, a foreign object detection section 112 (including a takeover state detection section 114), a full-charge notification (power transmission stop request) detection section 116, and a power transmission control section 118 that ON/OFF-controls power transmission based on the detection result of each section.

Basic Sequence Example of Non-Contact Power Transmission System

Figure 6:
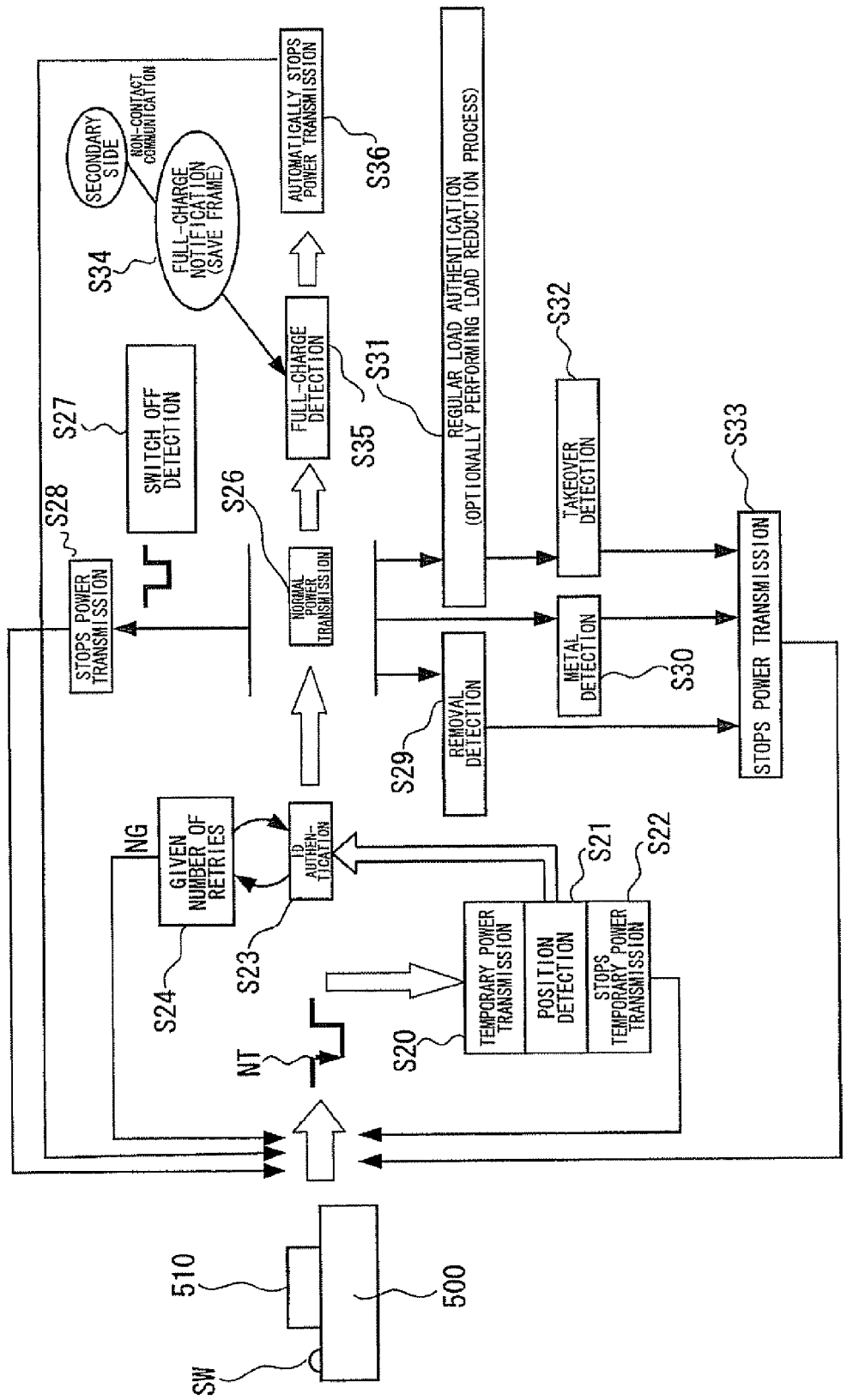
FIG. 6 is a view showing a basic sequence example of a non-contact power transmission system.

FIG. 6 is a view showing a basic sequence example of the non-contact power transmission system. The switch SW is provided on the power-transmission-side electronic instrument (power-transmission-side instrument) 500 (see left).

The user places the power-reception-side electronic instrument (power-reception-side instrument) 510 at a predetermined position, and presses the switch SW. The power transmission device 10 starts temporary power transmission based on an edge (e.g., negative edge NT) which occurs when the user has pressed the switch SW as a trigger (S20), and performs position detection (step S21). When the power-reception-side instrument 510 is placed at an inappropriate position, the power transmission device 10 stops temporary power transmission (step S22).

When the power-reception-side instrument 510 is placed at an appropriate position, the power transmission device 10 performs ID authentication (step S23). Specifically, ID authentication information (e.g. manufacturer information, instrument ID number, and rating information) is transmitted from the power-reception-side instrument to the power-transmission-side instrument. Since ID authentication may fail accidentally, it is preferable to allow a given number of (e.g., three) retries taking convenience to the user into account, and determine that ID authentication has failed when failure (NG) has occurred successively (step S24).

After ID authentication, the power transmission device 10 starts normal power transmission for the power reception device 40 (step S26). When the power transmission device 10 has detected that the switch (SW) has been pressed (turned OFF) during normal power transmission (step S27), the power transmission device 10 stops normal power transmission and returns to the initial state (step S28).

The power transmission device 10 performs removal detection (step S29), metal foreign object detection (step S30), secondary-side regular load authentication (including a secondary-side load reduction process: step S31), and takeover state detection (step S32), and stops normal power transmission when one of these states has been detected (step S33).

The term "secondary-side load reduction process" accompanying regular load authentication refers to a process that reduces the load state of the power-supply-target load 90 (e.g., battery) during regular load authentication.

Specifically, when the load state of the power-supply-target load 90 is heavy, the primary-side instrument may not successfully receive the modulation signal even if load modulation is performed by causing the transistor TB3 to be turned ON/OFF. Therefore, when performing regular load modulation (i.e., regular load authentication) for detecting a takeover state, a current supplied to the power-supply-target load 90 is temporarily reduced (or stopped) to apparently reduce the load state of the load 90 (battery) (described later in detail with reference to FIG. 17).

In FIG. 6, when the power reception device 40 has detected that a full-charge state has occurred, the power reception device 40 creates a full-charge notification (save frame; power transmission stop request frame) and transmits the full-charge notification to the power-transmission-side instrument (step S34). When the power transmission device 10 has detected the full-charge notification (power transmission stop request frame) (step S35), the power transmission device 10 stops normal power transmission and returns to the initial state (step S36).

Figure 7:
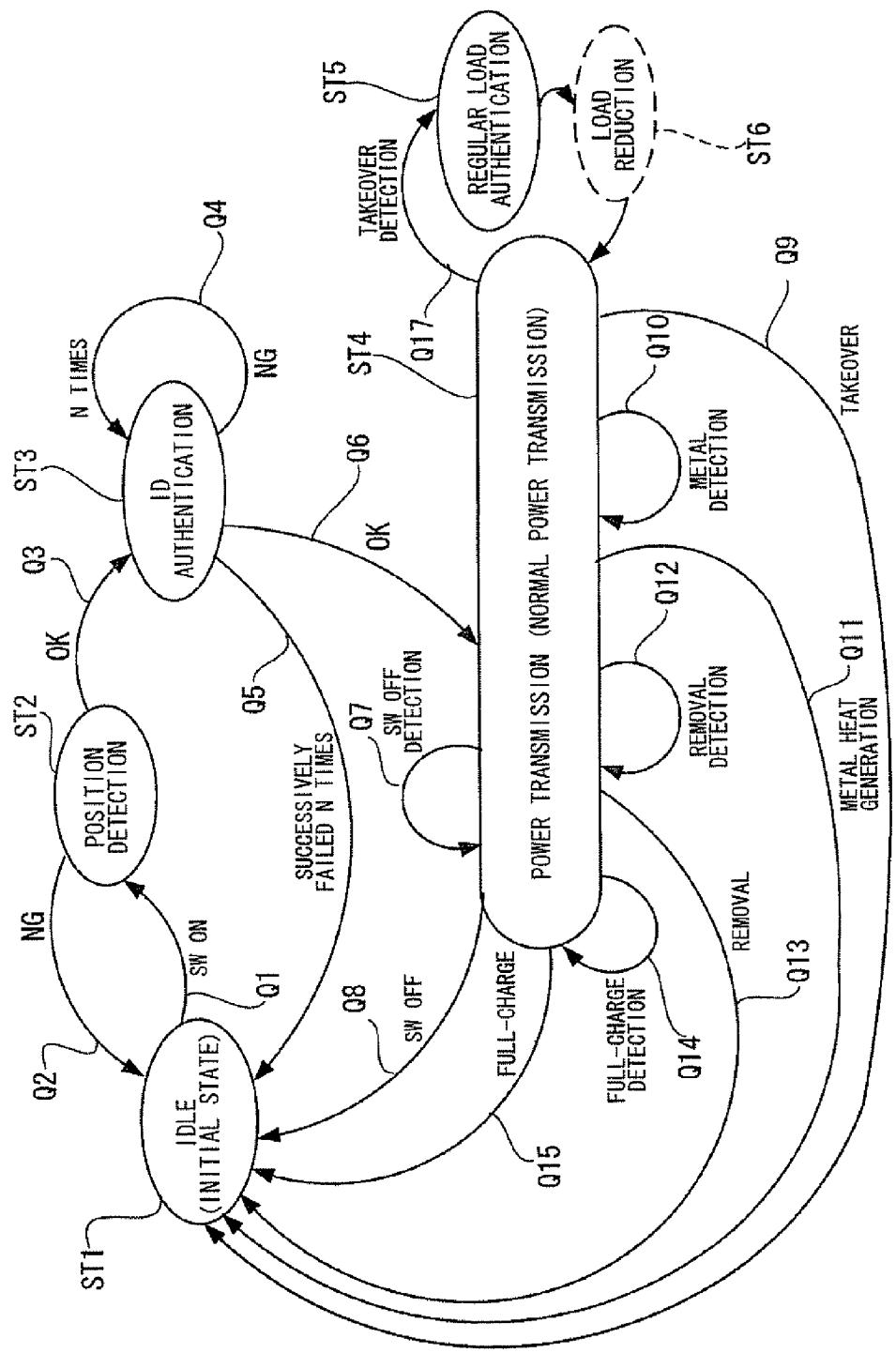
FIG. 7 is a state transition diagram showing the state transition of a non-contact power transmission system that performs the sequence shown in FIG. 6.

FIG. 7 is a state transition diagram showing the state transition of the non-contact power transmission system that performs the sequence shown in FIG. 6. As shown in FIG. 7, the state of the non-contact power transmission system is roughly divided into an initial state (idle state: ST1), a position detection state (ST2), an ID authentication state (ST3), a power transmission (normal power transmission) state (ST4), and a regular load authentication state (ST5) (and a load reduction state (ST6)).

The non-contact power transmission system transitions from the state ST1 to the state ST2 when the switch has been turned ON (Q1), and returns to the state ST1 (Q2) when the position detection result is inappropriate (NG). When the position detection result is appropriate (OK), the non-contact power transmission system monitors whether or not ID authentication successively fails a plurality of times (Q4). When ID authentication has successively failed (Q5), the non-contact power transmission system transitions to the state ST1. When ID authentication has succeeded (Q6), the non-contact power transmission system transitions to the state ST4.

The non-contact power transmission system performs switch (SW) OFF detection (Q7), removal detection (Q12), metal detection (Q10), takeover state detection (Q17), and full-charge detection (Q14). The non-contact power transmission system returns to the initial state when one of these states has been detected (Q8, Q9, Q11, Q13 or Q15).

Since the non-contact power transmission system that performs the basic sequence shown in FIG. 6 starts power transmission when the switch has been turned ON, a reduction in power consumption and an improvement in safety can be achieved.

Since the non-contact power transmission system stops power transmission and returns to the initial state (switch ON wait state) when the non-contact power transmission system has received the full-charge notification (power transmission stop request), unnecessary power transmission does not occur. Therefore, a reduction in power consumption and an improvement in safety can be achieved.

Since normal power transmission is performed after ID authentication has been completed successfully, power is not transmitted to an inappropriate instrument. Therefore, reliability and safety are improved.

Various detection operations (i.e., removal detection, metal foreign object detection, takeover state detection based on regular load authentication, and full-charge detection) are performed during normal power transmission, and normal power transmission is promptly stopped and the initial state is recovered when one of these states has been detected. Therefore, unnecessary power transmission does not occur while taking all possible measures against a foreign object. This implements a system with extremely high reliability (safety).

Figure 8:
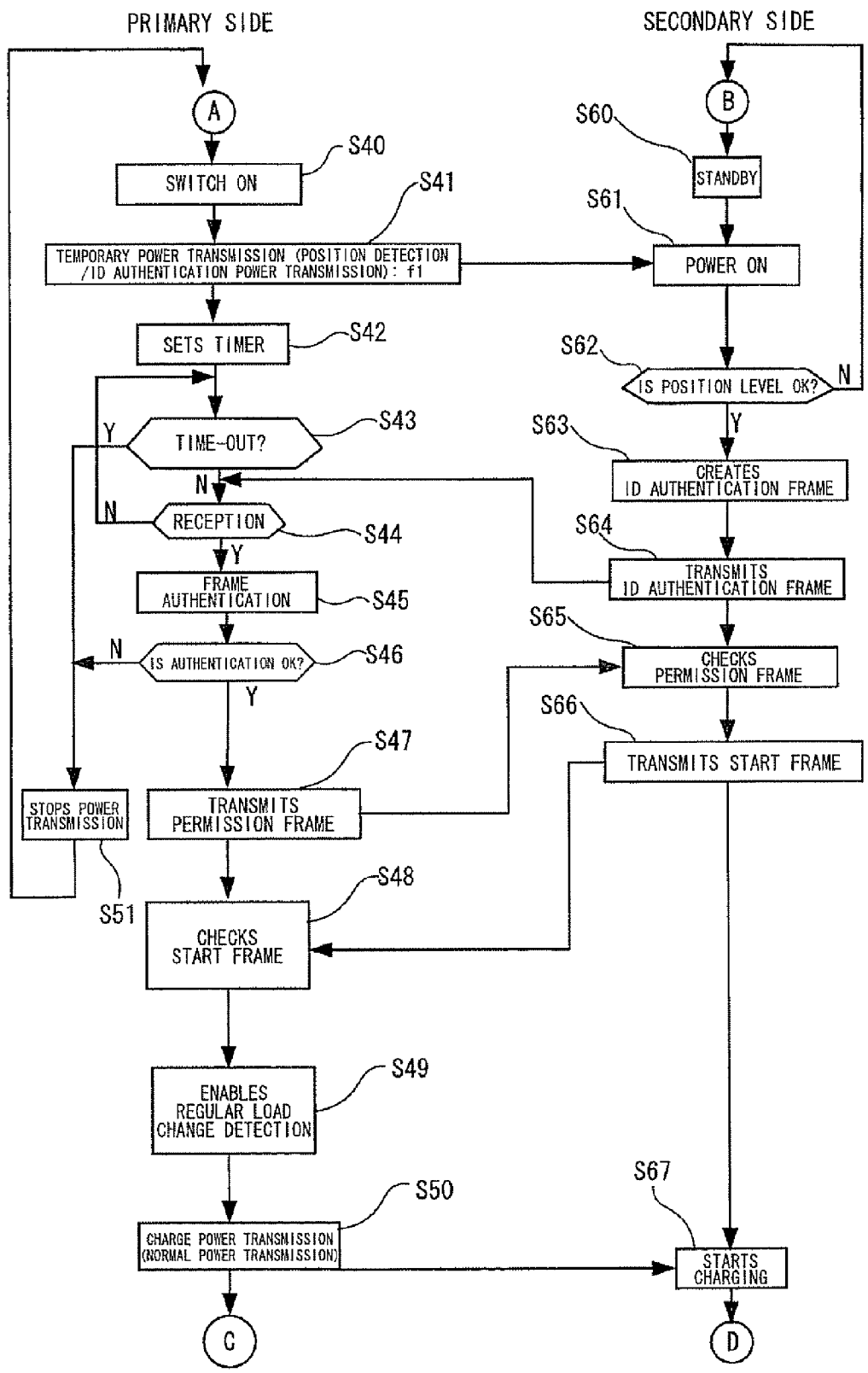
FIG. 8 is a flowchart showing an operation example of a non-contact power transmission system that performs the basic sequence shown in FIG. 6.
Figure 9:
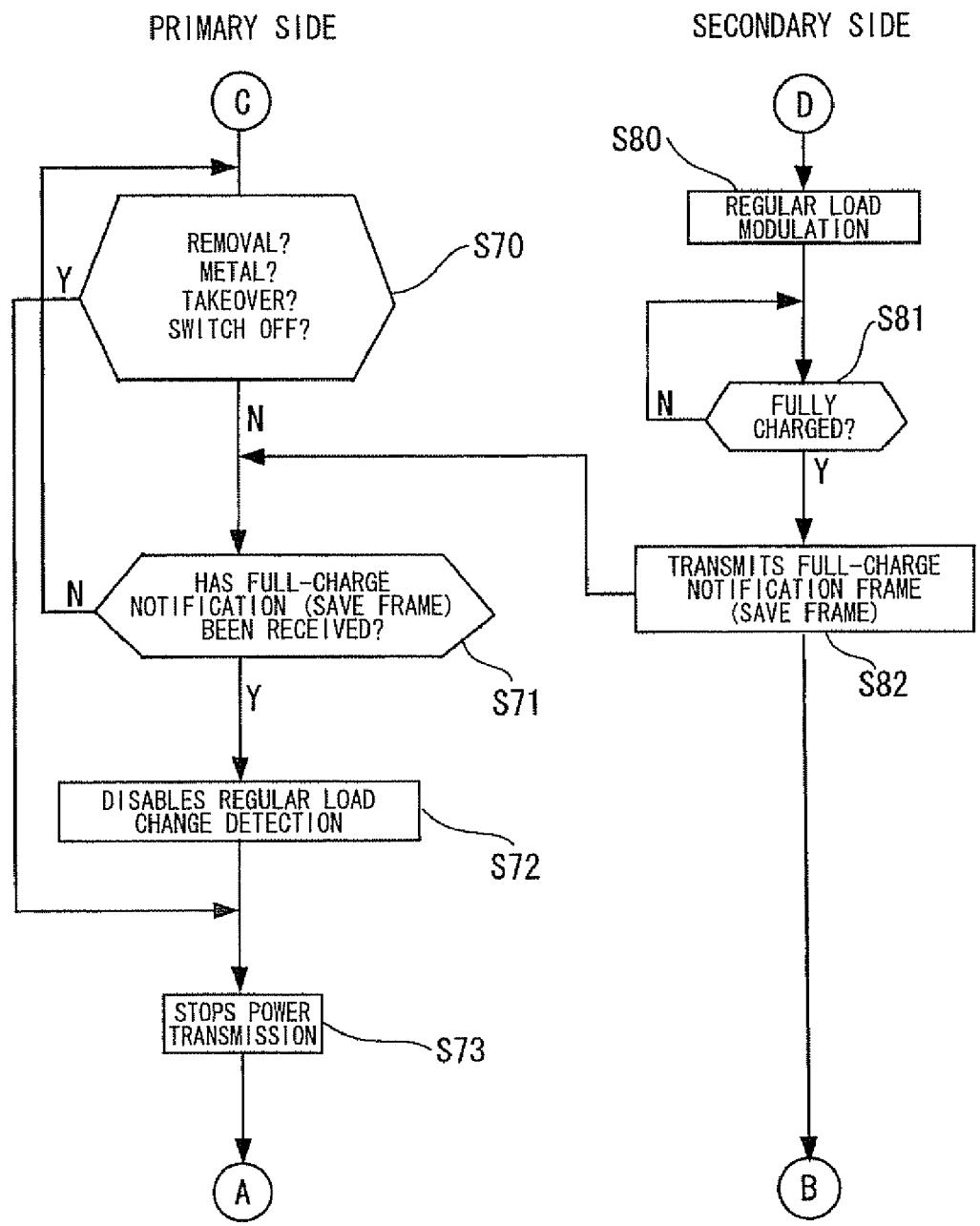
FIG. 9 is a flowchart showing an operation example of a non-contact power transmission system that performs the basic sequence shown in FIG. 6.

FIGS. 8 and 9 are flowcharts showing an operation example of the non-contact power transmission system that performs the basic sequence shown in FIG. 6. In FIGS. 8 and 9, a primary-side operation flow is shown on the left, and a secondary-side operation flow is shown on the right.

As shown in FIG. 8, when the switch SW has been turned ON (step S40), the power-transmission-side instrument starts temporary power transmission (e.g., the transmission frequency is f1; step S41), and a timer starts a count operation (step S42).

The power reception device 40 transitions from a standby state (step S60) to a power-ON state (step S61) when the power reception device 40 has received temporary power transmission, and determines the position level (position detection). When the position level is inappropriate (NG), the power reception device 40 returns to the initial state (step S60). When the position level is appropriate (OK), the power reception device 40 creates the ID authentication frame (S63), and transmits the ID authentication frame (step S64).

The power transmission device 10 receives the ID authentication frame (step S44), and determines whether or not a time-out has occurred (step S43). When the power transmission device 10 cannot receive the ID authentication frame within a given period of time, the power transmission device 10 stops power transmission (step S51).

When the power transmission device 10 has received the ID authentication frame within a given period of time, the power transmission device 10 performs a frame authentication process (step S45). When authentication has succeeded (OK), the power transmission device 10 transmits a permission frame to the power-reception-side instrument (step S47). When authentication has failed (NG), the power transmission device 10 stops power transmission (step S51).

The power reception device 40 checks the permission frame transmitted from the power transmission device 10 (step S65), and transmits a start frame to the power-transmission-side instrument (step S66).

The power transmission device 10 checks the start frame (step S48), enables regular load change detection (takeover state detection) (step S49), and starts charge power transmission (normal power transmission) (step S50).

The power reception device 40 receives normal power transmission (charge power transmission), and starts charging the power-supply-target load 90 (e.g., battery) (step S67).

FIG. 9 shows the subsequent flow. The power-transmission-side instrument waits for the full-charge notification (power transmission stop request) from the power-reception-side instrument (step S71) while performing removal detection, metal foreign object detection, takeover state detection, and switch OFF detection (step S70).

The power reception device 40 performs regular load modulation for takeover detection while charging the battery (step S80), and detects whether or not the battery has been fully charged (step S81). When the power reception device 40 has detected that the battery has been fully charged, the power reception device 40 transmits the full-charge notification frame (save frame: power transmission stop request) to the power transmission device (step S82).

When the power transmission device 10 has received the full-charge notification frame (save frame; power transmission stop request) from the power reception device 40, the power transmission device 10 disables regular load change detection (step S72), and stops power transmission (step S73).

Second Embodiment

This embodiment illustrates the details of takeover state detection (measures against takeover heat generation).

Measures Against Takeover Heat Generation

A large foreign object may be inserted between the primary coil and the secondary coil after the instrument has been authenticated and normal power transmission has started. A small or medium-sized metal foreign object can be detected by monitoring the induced voltage in the primary coil (L1), as described with reference to FIG. 11.

However, when a large metal foreign object (e.g., thin metal sheet) that blocks the primary coil and the secondary coil has been inserted between the primary-side instrument and the secondary-side instrument (see FIGS. 13A and 13B), the energy transmitted from the primary-side instrument is consumed by the metal foreign object (i.e., the metal foreign object acts as a load). Therefore, the primary-side instrument regards the metal foreign object as the secondary-side instrument. Accordingly, a situation in which removal of the secondary-side instrument cannot be detected based on the induced voltage in the primary coil as described with reference to FIG. 12 may occur, for example. In this case, power transmission from the power transmission device 10 is continuously performed although the secondary-side instrument is absent so that the temperature of the metal foreign object increases to a large extent.

A phenomenon in which a metal foreign object (conductive foreign object) takes over the secondary-side instrument in this way is referred to as "takeover (phenomenon)". In order to improve the safety and the reliability of the non-contact power transmission system to a practical level, it is necessary to take sufficient measures against such a takeover heat generation phenomenon.

A foreign object may be inserted accidentally or intentionally. Since heat is generated when a foreign object is inserted, a skin burn or damage to or destruction of the instrument may occur. Therefore, sufficient safety measures against foreign object insertion must be taken for the non-contact power transmission system. Measures against takeover heat generation are described in detail below.

Figure 13A:
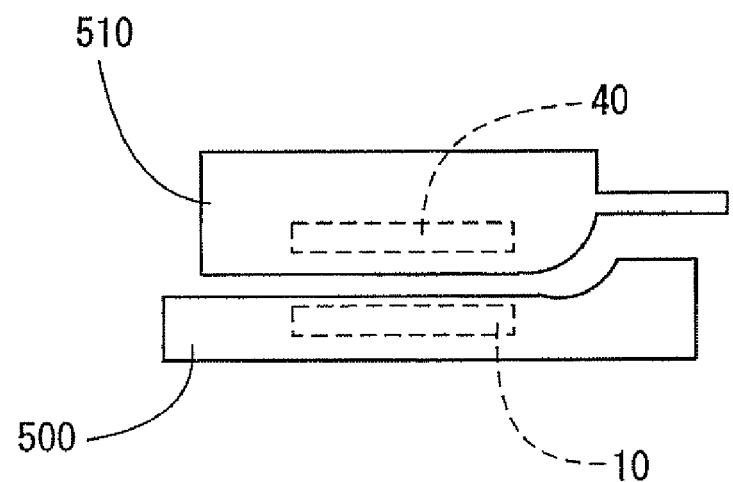
Figure 13B:
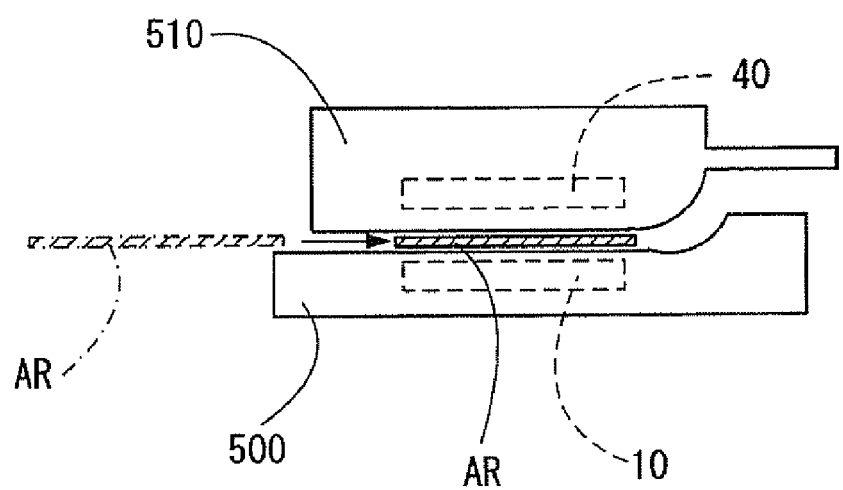

FIGS. 13A and 13B are cross-sectional views showing electronic instruments that form a non-contact power transmission system which are illustrative of insertion of a foreign object (takeover state) after normal power transmission has started.

In FIG. 13A, the portable telephone 510 (electronic instrument including the power reception device 40) is placed at a given position on the cradle 500 (electronic instrument including the power transmission device 10). Non-contact power transmission is performed from the cradle 500 (charger) to the portable telephone 510 through the primary coil and the secondary coil so that the secondary battery (e.g., battery pack) provided in the portable telephone 510 is charged.

In FIG. 13B, a thin sheet-shaped metal foreign object (conductive foreign object) AR is intentionally inserted between the cradle 500 (charger) and the portable telephone 510 during normal power transmission. When the foreign object AR has been inserted, power supplied from the primary-side instrument (cradle 500) to the secondary-side instrument (portable telephone terminal 510) is almost entirely consumed by the foreign object (AR) (i.e., the transmitted power is taken over), whereby the foreign object AR is likely to generate heat. Therefore, when the state shown in FIG. 13B has occurred, the power transmission device 10 included in the primary-side instrument (cradle 500) must detect insertion of the foreign object AR and immediately stop normal power transmission.

However, it is difficult to detect the takeover state shown in FIG. 13B using the metal foreign object detection method described with reference to FIG. 11.

For example, the amplitude of the voltage induced in the primary coil (L1) increases as the load of the power reception device increases, and decreases as the load of the power reception device decreases. If the secondary battery 94 of the portable telephone 510 is normally charged, the load of the power reception device 40 gradually decreases with the passage of time. When the load of the power reception device 40 has rapidly increased, the power transmission device 10 can detect the rapid increase in load since the power transmission device 10 monitors a change in the load of the power reception device 40.

However, the power transmission device 10 cannot determine whether the increase in load has occurred due to the battery (the secondary battery 94 of the portable telephone), mispositioning between the portable telephone 510 and the cradle 500, or insertion of a foreign object. Therefore, insertion of a foreign object cannot be detected using the method in which the power transmission device 10 merely detects a change in the load of the power reception device 40.

In the invention, the power reception device 40 intermittently changes the load of the power reception device (regular load modulation operation) during normal power transmission while supplying power to the power-supply-target load 90 (e.g., secondary battery) to transmit information to the power transmission device 10.

The following items are confirmed when the power transmission device 10 has detected the information obtained by intermittently (and regularly) changing the load at a given timing.

(1) The instrument (i.e., portable telephone 510) including the power reception device 10 is appropriately placed on the instrument (i.e., cradle 500) including the power transmission device 10.

(2) The instrument (including the secondary battery of the portable telephone 510) including the power reception device 10 is operating normally.

(3) The foreign object AR is not inserted.

When the foreign object AR has been inserted during normal power transmission, the information transmitted from the power reception device 40 is blocked by the foreign object AR and does not reach the power transmission device 10. Specifically, the power transmission device 10 cannot detect an intermittent (e.g., regular) change in the load of the power reception device. It is most likely that an intermittent change in load cannot be detected after the above-mentioned items (1) to (3) have been confirmed because the foreign object AR has been inserted (item (3)). Specifically, the power transmission device 10 can determine that the power transmission device 10 has become unable to detect an intermittent change in load due to insertion of the foreign object AR.

Figure 14A:
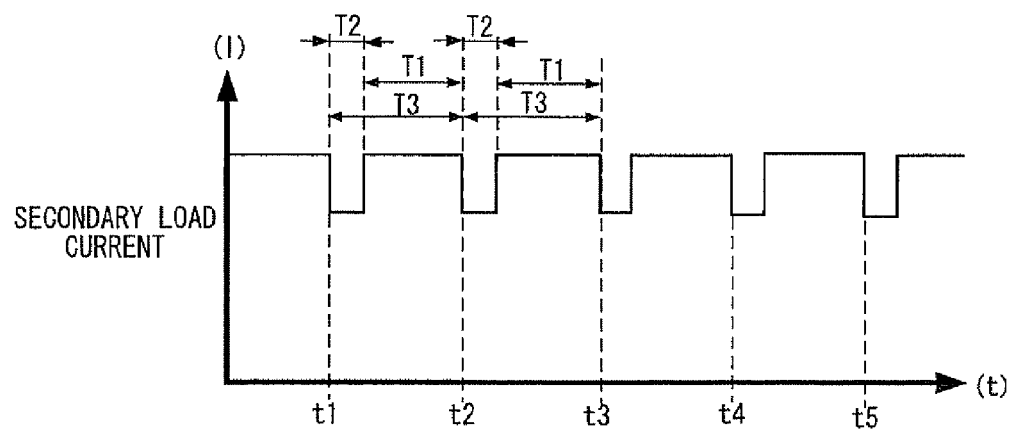
FIGS. 14A and 14B are views illustrative of a specific embodiment when intermittently changing the load of a power reception device so that insertion of a foreign object can be detected.
Figure 14B:
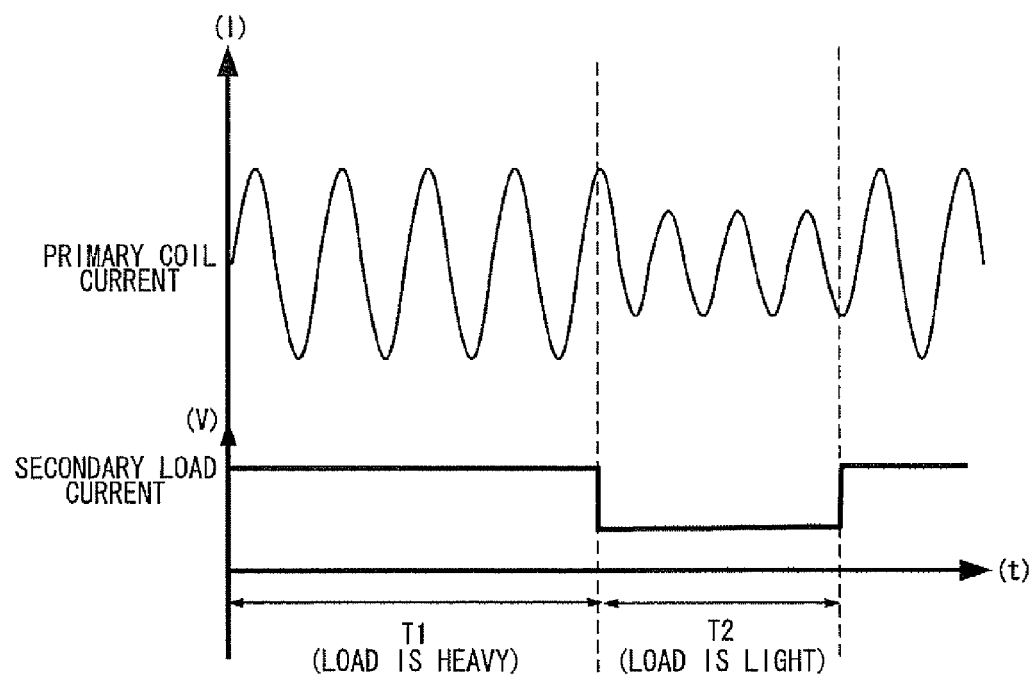

FIGS. 14A and 14B are views illustrative of a specific embodiment when intermittently changing the load of the power reception device so that insertion of a foreign object can be detected.

In FIG. 14A, an intermittent change in the load of the power reception device is indicated by a change in secondary current (current that flows through the secondary coil L2). As shown in FIG. 14A, the load of the power reception device intermittently changes at times t1, t2, t3, t4, t5, . . . .

In FIG. 14A, the load changes in a cycle T3. The load decreases in a period T2 starting from the time t1, and increases in the subsequent period T1, for example. Such a periodic change in load is repeated in the cycle T3.

FIG. 14B shows a change in primary coil voltage (induced voltage at one end of the primary coil) with respect to a change in secondary load current. The secondary-side load increases in the period T1 and decreases in the period T2, as described above. The amplitude (peak value) of the induced voltage (primary coil voltage) at one end of the primary coil (L1) changes corresponding to the change in secondary-side load.

Specifically, the amplitude increases in the period T1 in which the load increases, and decreases in the period T2 in which the load decreases. Therefore, the power transmission device 10 can detect a change in the load of the power reception device 40 by detecting the peak of the primary coil voltage using the waveform detection circuit 28 (see FIG. 2), for example.

Note that the load change detection method is not limited to the above-described method. For example, the phase of the primary coil voltage or the primary coil current may be detected.

The load can be easily modulated by switching the load modulation transistor TB3, for example. The peak voltage of the primary coil or the like can be accurately detected using an analog or digital basic circuit. Therefore, the above-described method imposes a load on the instrument to only a small extent and is easily implemented. The above-described method is also advantageous in terms of a reduction in mounting area and cost.

As described above, insertion of a foreign object can be easily and accurately detected without adding a special configuration by employing a novel method in which the power reception device 40 transmits information obtained by intermittently (and cyclically) changing the load during normal power transmission and the power transmission device 10 detects the change in load.

Specific Example of Detection of Foreign Object Insertion

Figure 15:
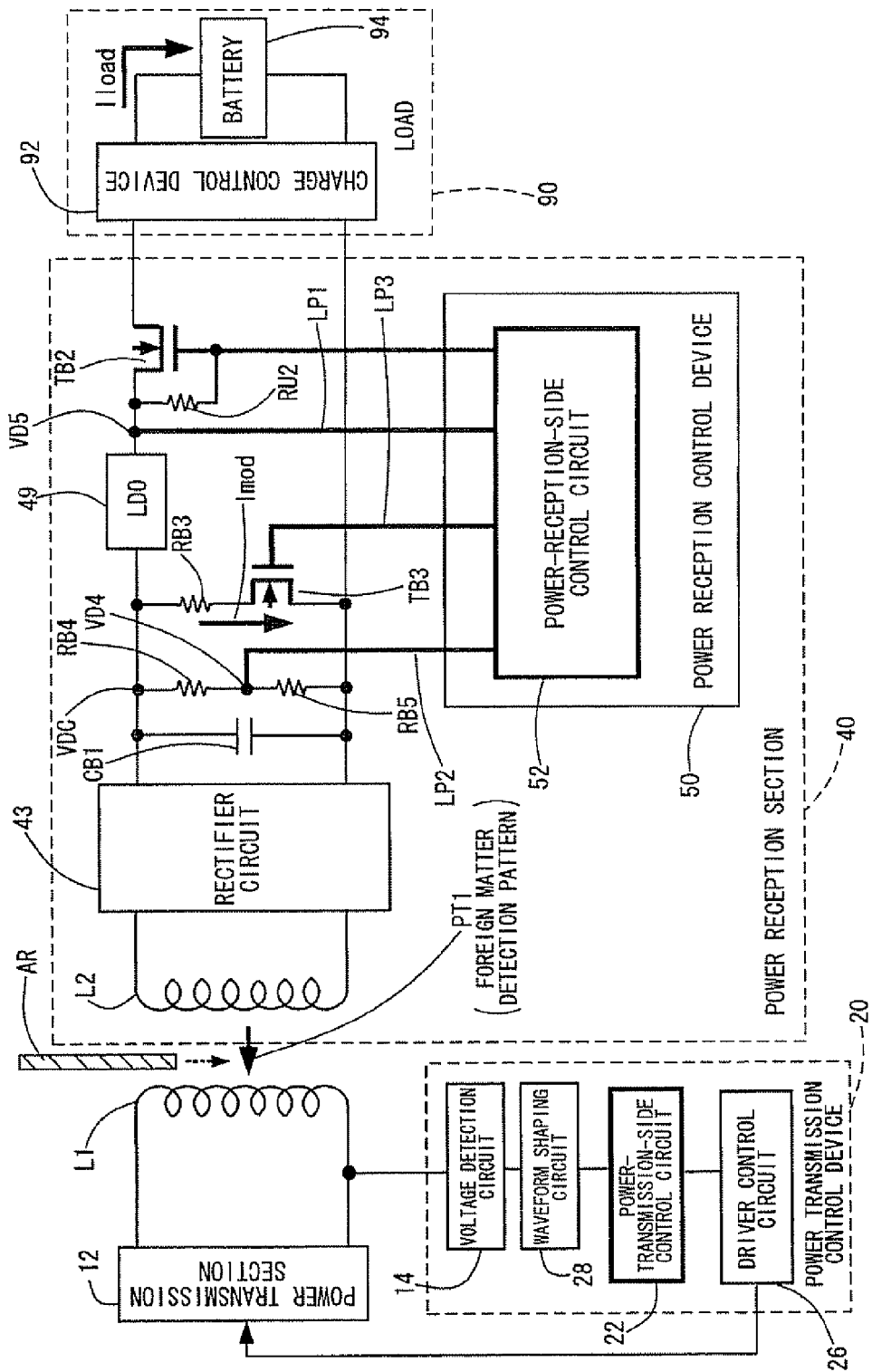
FIG. 15 is a circuit diagram showing the main configuration of the non-contact power transmission system shown in FIG. 2 relating to detection of foreign object insertion (takeover state).

FIG. 15 is a circuit diagram showing the main configuration of the non-contact power transmission system shown in FIG. 2 relating to detection of foreign object insertion (takeover state). In FIG. 15, the same sections as in FIG. 2 are indicated by the same reference symbols. In FIG. 15, a bold line indicates a portion that plays an important role in detecting foreign object insertion.

A notable circuit configuration of the power reception device 40 shown in FIG. 15 includes the load modulation transistor TB3 of the load modulation section 46 (see FIG. 2), the power supply control transistor TB2 of the power supply control section 48 (see FIG. 2), and the power-reception-side control circuit 52 that ON/OFF-controls these transistors (TB2 and TB3). It is also important that the voltages at the input terminal and the output terminal of the series regulator (LDO) 49 are input to the power-reception-side control circuit 52 through the signal lines LP2 and LP1 so that the load state (degree of load) of the battery 94 (secondary battery) included in the load 90 can be detected by monitoring the voltage across the series regulator (LDO) 49.

The configuration of the power transmission control device 20 of the power transmission device 10 (see FIG. 2) is also important. Specifically, it is important that the peak value (amplitude) of the induced voltage in the primary coil (L1) is detected by the waveform detection circuit 28 and a change in the load of the power reception device 40 is detected by the power-transmission-side control circuit 22.

In FIG. 15, the power reception device 40 modulates the load during normal power transmission (continuous power transmission after authentication), and transmits a foreign object detection pattern PT1 to the power transmission device 10. The power-transmission-side control circuit 22 of the power transmission device 10 (successively or intermittently) monitors a chance in the load of the power reception device 40 during normal power transmission. The power-transmission-side control circuit 22 determines that the foreign object AR has been inserted when the power-transmission-side control circuit 22 has become unable to receive the foreign object detection pattern PT1 and stops normal power transmission.

Specific Embodiment of Foreign Object Detection Pattern PT1

Figure 16A:
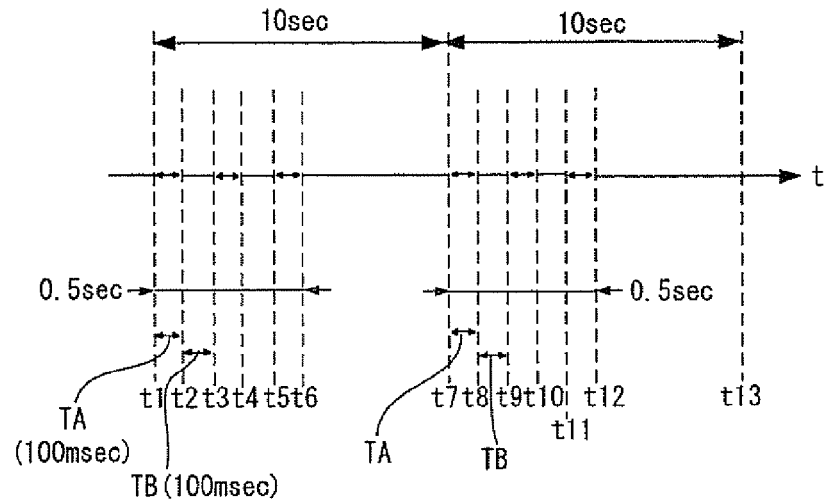
FIGS. 16A and 16B are views illustrative of a specific preferred embodiment of load modulation that enables foreign object detection.
Figure 16B:
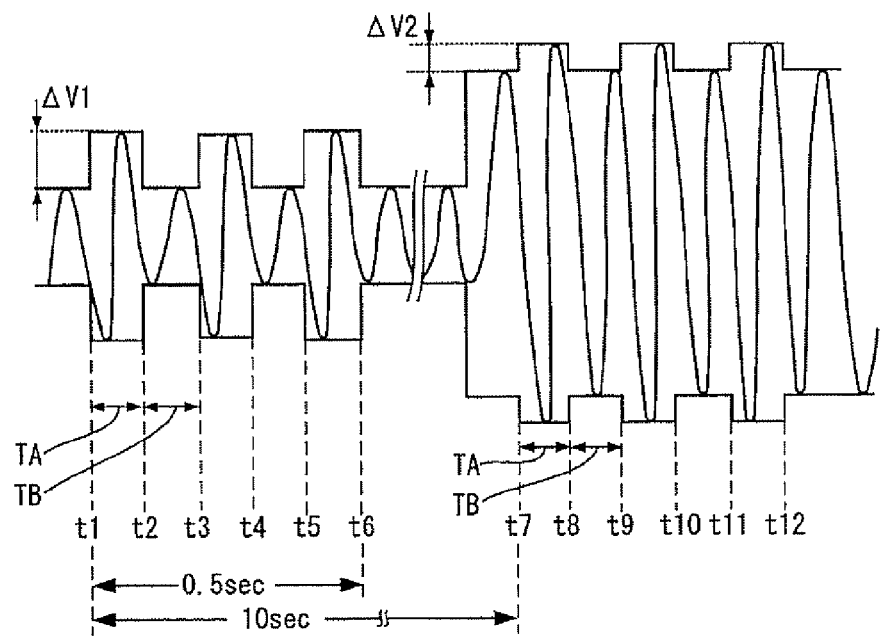

FIGS. 16A and 16B are views illustrative of a specific preferred embodiment of load modulation that enables foreign object detection. FIG. 16A is a view showing a load modulation timing example, and FIG. 16B is a view showing a change in the load of the power reception device detected by the power transmission device in detail.

As shown in FIG. 16A, load modulation that enables foreign object detection is cyclically (regularly) performed in a cycle of 10 sec, for example.

Load modulation that enables foreign object detection is performed in a period from time t1 to t6 and a period from time t7 to t12. A period from time t1 to t6 (from time t7 to t12) is 0.5 sec. The degree of load is changed in units of 0.1 sec (100 msec) obtained by equally dividing 0.5 sec by five.

In FIG. 16A, a bold bidirectional line indicates a period in which the load increases. Specifically, the load increases in a period from time t1 to t2, a period from time t3 to t4, a period from time t5 to t6, a period from time t7 to t8, a period from time t9 to t10, and a period from time t11 to t12. A period in which the load increases is referred to as a period TA.

The load decreases in a period from time t2 to t3, a period from time t4 to t5, a period from time t8 to t9, and a period from time t10 to t11. A period in which the load decreases is referred to as a period TB.

In FIG. 16A, the load of the power reception device is intermittently changed cyclically (i.e., in cycle units (in units of one cycle)) during normal power transmission, and the load is intermittently changed a plurality of times at given intervals within one cycle.

The power transmission device 10 and the power reception device 40 can transfer the information relating to a change in load in synchronization by cyclically changing the load (i.e., the power transmission device 10 can easily determine the timing at which the load of the power reception device 40 changes).

In FIG. 16A, the load is intermittently changed a plurality of times at given intervals only in a given period (times t1 to t6) within one cycle (e.g., times t1 to t7). Specifically, load modulation is performed only in the first period (0.5 sec) of one cycle (10 sec). The reasons that load modulation is performed in this manner are as follows.

Specifically, since a change in load (load modulation) during normal power transmission may affect power supply to the battery (battery 94 shown in FIG. 15), it is undesirable to frequently change the load to a large extent. Therefore, one cycle of load modulation is increased to some extent (a foreign object can be detected even if the cycle of load modulation is increased to some extent).

The load is intermittently changed a plurality of times at given intervals only in a given period within one cycle. Specifically, when the load change interval is increased to a large extent, the power transmission device may not appropriately detect an intermittent change in the load of the power reception device due to a change in the load state of the battery with the passage of time or a change in surrounding conditions. Therefore, one cycle is increased (10 sec in FIG. 16A), and the load is intermittently modulated a plurality of times (five times in FIG. 16A) only in a short period (0.5 sec in FIG. 16A) within one cycle, for example.

The power transmission device 10 can detect a foreign object (AR) with high accuracy while minimizing an effect on power supply to the battery 94 (e.g., charging of a battery pack) by performing load modulation in this manner.

FIG. 16B shows an example of a change in the amplitude of the induced voltage at one end of the primary coil (L1) of the power transmission device 10 corresponding to the load of the power reception device. In FIG. 16B, the load state of the battery 94 differs between a load modulation period (t1 to t6) in the first cycle and a load modulation period (t7 to t12) in the second cycle. The load state of the battery 94 increases in the second cycle so that the peak value of the primary coil voltage to increases.

At times t1 to t6 in FIG. 16B, the difference between the primary coil voltage in the period TA in which the load increases and the primary coil voltage in the period TB in which the load decreases is ΔV1. The power-transmission-side control circuit 22 of the power transmission device 10 can detect a chance in the load of the power reception device 40 from the difference ΔV1 in the amplitude of the primary coil voltage.

In the second load modulation period (times t7 to t12), since the load state of the battery 94 increases so that a charging current (Iload) supplied to the battery 94 increases, the ratio of a modulation current (Imod) due to load modulation to the charging current (Iload) decreases so that the difference in primary coil voltage caused by causing the modulation current (Imod) to be turned ON/OFF decreases to ΔV2 (ΔV2<ΔV1).

Specifically, the modulation current (Imod) is buried in the charging current (Iload) supplied to the battery 94. Therefore, when the load state of the battery 94 is heavy, it is difficult for the power transmission device 10 to detect a change in load as compared with the case where the load state of the battery 94 is light. In this embodiment, the load state of the battery 94 is reduced by reducing power supplied to the battery 94 so that the power transmission device 10 can easily detect a change in load due to load modulation. A process of reducing the load state of the power-supply-target load (e.g., battery) is described below.

Process of Reducing Load State of Power-Supply-Target Load

In this embodiment, since load modulation is performed without stopping power supply to the battery 94 during normal power transmission, transmission of a signal due to load modulation to the power transmission device 10 is necessarily affected by the state of power supply to the battery 94 (i.e., the load state of the battery).

As described above, even if a small current is turned ON/OFF for load modulation when a large amount of charging current is supplied to the battery 94 (e.g., battery pack), since the amount of ON/OFF current (Imod) is smaller than the amount of charging current (Iload) supplied to the battery 94, it is difficult for the power transmission device 10 to detect a change in load due to load modulation (i.e., it is difficult for the power transmission device 10 to detect whether a change in load is noise or a signal due to load modulation).

On the other hand, the relative ratio of the ON/OFF current (Imod) due to load modulation increases when the amount of current supplied to the battery 94 is small (i.e., when the load state of the battery is light) so that the power transmission device 10 can easily detect a change in load due to the ON/OFF operation.

According to this embodiment, the power reception device 40 monitors the load state of the battery 94 during normal power transmission, and, when the load state of the battery 94 is heavy (i.e., a large amount of current is supplied to the battery 94) when the power reception device 40 performs load modulation that enables foreign object detection, the amount of power supplied to the battery 94 is reduced based on the above consideration. For example, the amount of power supply is reduced without stopping power supply to the battery 94 so that at least a minimum amount of power is supplied to the battery 94.

Since the load state of the battery 94 is apparently reduced by reducing the amount of power supplied to the battery 94, the power transmission device 10 can easily detect a signal due to load modulation. Therefore, the foreign object detection accuracy is maintained at a desired level even when the load state of the battery 94 is heavy.

Since at least a minimum amount of power is supplied to the battery 94 even when reducing the load state of the power-supply-target load 90, a problem in which the electronic circuit (charge control device 92) of the battery 94 cannot operate does not occur.

Moreover, since load modulation that enables detection of insertion of a foreign object is intermittently performed at appropriate intervals taking the effect on power supply to the battery 94 into consideration, power supply to the battery 94 is not adversely affected even if the load is reduced. For example, a problem in which the charging time of the battery pack increases to a large extent does not occur.

Therefore, the load change detection accuracy of the power transmission device 10 can be maintained at a desired level, even if the load state of the battery 94 is heavy, by causing the power reception device 40 to monitor the state of the battery 94 and reduce the load state of the battery 94, as required, when performing load modulation that enables detection of insertion of a foreign object.

Figure 17A:
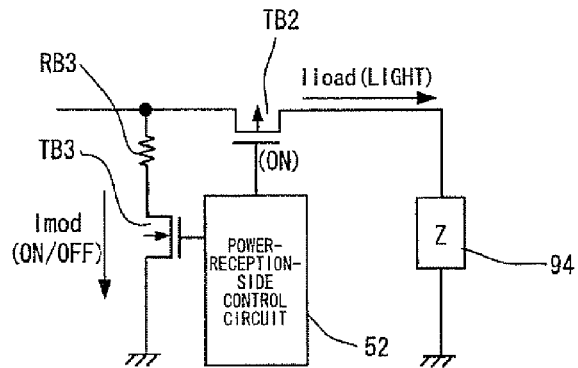
FIGS. 17A to 17E are views illustrative of an operation of reducing the load state of a power-supply-target load (e.g., battery).
Figure 17B:
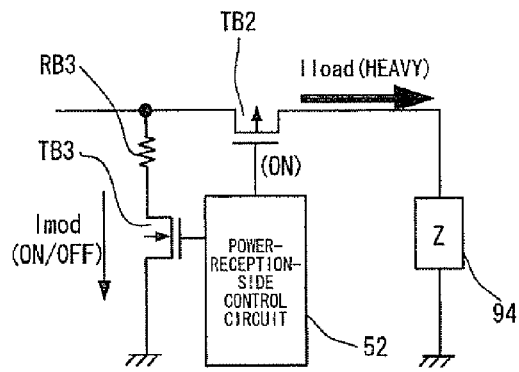
Figure 17C:
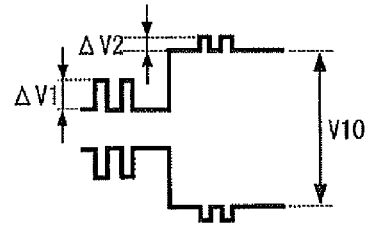
Figure 17D:
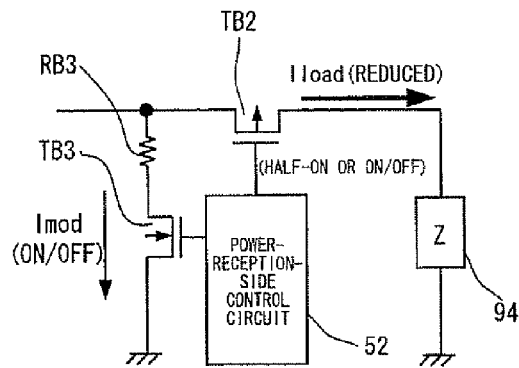
Figure 17E:
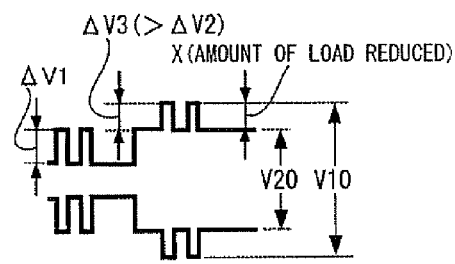

FIGS. 17A to 17E are views illustrative of the battery load state reduction operation. FIG. 17A is a view showing a state in which the load state of the battery 94 is light, FIG. 17B is a view showing a state in which the load state of the battery 94 is heavy, FIG. 17C is a view showing a change in primary coil voltage in the state shown in FIG. 17B, FIG. 17D is a view showing a state in which the load state of the battery is reduced by causing a power supply control transistor to be turned ON/OFF or set in a half ON state, and FIG. 17E is a view showing a change in primary coil voltage in the state shown in FIG. 17D.

In FIG. 17A, since the load state of the battery 94 is light (i.e., the charging current Iload supplied to the battery is small), the power transmission device 10 can sufficiently detect a change in load due to load modulation without causing the power reception device 40 to reduce the load state of the battery. Therefore, the power supply control transistor TB2 is always turned ON. The load modulation transistor TB3 is intermittently turned ON/OFF to implement load modulation.

In FIG. 17B, since the load state of the battery 94 is heavy (i.e., the charging current Iload supplied to the load is large), it is difficult for the power transmission device 10 to detect a change in modulation current (Imod) due to the ON/OFF operation.

As shown in FIG. 17C, when the load state of the battery 94 has increased, the difference in amplitude of the primary coil voltage decreases from $\Delta V1$ to $\Delta V2$, whereby it becomes difficult to detect a change in load due to load modulation.

In FIG. 17D, the power reception device 40 reduces the load state of the battery 94 when performing load modulation. In FIG. 17D, the power reception device 40 causes the power supply control transistor TB2 to be successively turned ON/OFF or set in a half ON state.

Specifically, the amount of power supplied to the battery 94 can be reduced by utilizing a digital method in which the power reception device 40 causes the power supply control transistor TB2 provided in a power supply path to be successively turned ON/OFF to intermittently supply power to the battery 94. The operation of successively switching a transistor is generally employed for a digital circuit and is easily implemented. Moreover, it is possible to accurately reduce the amount of power supplied to the battery 94 by selecting the switching frequency.

The amount of power supplied to the battery 94 can also be reduced by utilizing an analog method in which an intermediate voltage between a complete ON voltage and a complete OFF voltage is supplied to the gate of the power supply control transistor (PMOS transistor) to set the PMOS transistor in a half ON state. This method has an advantage in that the on-resistance of the power supply control transistor (PMOS transistor) can be finely adjusted by controlling the gate voltage.

In FIG. 17E, the amplitude of the primary coil voltage when the load state of the battery is heavy changes from V10 to V20 by reducing the load state of the power-supply-target load 90 (i.e., battery 94). In FIG. 17E, "X" indicates the amount by which the load state of the battery 94 is reduced. The difference in amplitude of the primary coil voltage increases from $\Delta V2$ (see FIG. 17C) to $\Delta V3$ ($\Delta V3 > \Delta V2$) by reducing the load state of the battery 94, whereby the power transmission device 10 can easily detect a change in the load of the power reception device 40 due to load modulation.

The power transmission device can reliably detect a change in load, even when the load state of the battery 94 is heavy, by causing the power reception device to reduce the load state of the power-supply-target load 90 (battery 94) while performing load modulation.

Specific Operation of Power Transmission Device

A specific operation of the power transmission control device 20 shown in FIG. 15 is described below. As described above, the regular load change detection section 14 (see FIG. 5) of the power-transmission-side control circuit 22 included in the power transmission control device 20 determines that a foreign object (AR) has been inserted between the primary coil (L1) and the secondary coil (L2) when the regular load change detection section 14 cannot detect an intermittent change in the load of the power reception device 40 during normal power transmission, and stops power transmission.

This reliably prevents heat generation from the foreign object (AR), a skin burn, and damage to and destruction of the instrument. Therefore, highly reliable foreign object insertion measures are implemented for a non-contact power transmission system.

Since it is necessary to carefully determine the presence or absence of insertion of a foreign object, it is preferable that the power-transmission-side control circuit 22 detect a change in load in cycle units and determine that a foreign object has been inserted between the primary coil and the secondary coil when the power-transmission-side control circuit 22 cannot detect a change in load over a given number of cycles.

For example, the power-transmission-side control circuit 22 detects a change in the load of the power reception device in cycle units, and stops normal power transmission when the power-transmission-side control circuit 22 cannot detect a change in load over a given number of cycles (e.g., three cycles). This increases the foreign object insertion detection accuracy, thereby preventing a situation in which the power-transmission-side control circuit 22 erroneously stops normal power transmission when a change in load cannot be detected due to an accidental factor.

A change in the load of the power reception device 40 can be detected by detecting the waveform of the induced voltage in the primary coil (L1). The waveform can be detected by the waveform detection circuit 22.

Since the peak value (amplitude) of the waveform of the induced voltage in the primary coil (L1) increases when the load of the power reception device 40 is heavy and decreases when the load of the power reception device 40 is light, a change in the load of the power reception device 40 can be detected by detecting the peak of the waveform. Note that the load change detection method is not limited to the above-described method. For example, a change in load may be detected by detecting the phase of the induced voltage or current in the primary coil.

According to this embodiment, a novel power reception device 10 having a function of detecting foreign object insertion (takeover) by regular load authentication is implemented. According to this embodiment, insertion of a foreign object between the primary coil and the secondary coil can be accurately detected by simple signal processing while reducing the number of parts to implement highly reliable safety measures relating to non-contact power transmission.

Moreover, the power transmission stop function due to regular load authentication can be utilized to compulsorily stop inappropriate power transmission in addition to detect the takeover state. For example, power transmission from the primary-side instrument is reliably stopped when removal of the secondary-side instrument cannot be detected for some reason, or the secondary-side instrument cannot perform regular load modulation due to a breakdown or a failure (malfunction), for example. Therefore, the safety and the reliability of the non-contact power transmission system are remarkably improved by providing the regular load authentication function.

As described above, at least one embodiment of the invention can provide non-contact power transmission technology that can further reduce power consumption. At least one embodiment of the invention can provide highly reliable non-contact power transmission technology that ensures appropriate safety measures. At least one embodiment of the invention can provide non-contact power transmission technology that sufficiently takes convenience to the user into account. At least one embodiment of the invention can provide non-contact power transmission technology that reduces the size and the cost of a non-contact power transmission system by reducing the number of parts.

According to at least one embodiment of the invention, the following main effects can be obtained, for example. Note that the following effects are not necessarily achieved at the same time. Accordingly, the following effects do not in any way limit the technical scope of the invention.

(1) Since the non-contact power transmission system according to the invention starts power transmission when the switch has been turned ON, an improvement in convenience to the user, a reduction in power consumption, and an improvement in safety can be achieved.

(2) Since the non-contact power transmission system according to the invention stops power transmission and returns to the initial state (switch ON wait state) when the non-contact power transmission system has received the full-charge notification (power transmission stop request), unnecessary power transmission does not occur. Therefore, a reduction in power consumption and an improvement in safety can be achieved.

(3) Since normal power transmission is performed after ID authentication has been completed successfully, power is not transmitted to an inappropriate instrument. Therefore, reliability and safety are improved.

(4) Various detection operations (i.e., removal detection, metal foreign object detection, takeover state detection based on secondary-side regular load authentication, and full-charge detection) are performed during normal power transmission, and normal power transmission is promptly stopped and the initial state is recovered when one of these states has been detected. Therefore, unnecessary power transmission does not occur while taking all possible measures against a foreign object. This implements a system with extremely high reliability (safety).

Although only some embodiments of the invention have been described in detail above, those skilled in the art would readily appreciate that many modifications are possible in the embodiments without materially departing from the novel teachings and advantages of the invention. Specifically, many modifications are possible in the embodiments without materially departing from the novel teachings and advantages of the invention.

Accordingly, such modifications are intended to be included within the scope of the invention. Any term (e.g., GND and portable telephone/charger) cited with a different term (e.g., low-potential-side power supply and electronic instrument) having a broader meaning or the same meaning at least once in the specification and the drawings can be replaced by the different term in any place in the specification and the drawings. Any combinations of the embodiments and the modifications are also included within the scope of the invention.

The configurations and the operations of the power transmission control device, the power transmission device, the power reception control device, and the power reception device and the method of detecting the secondary-side load by the primary side instrument are not limited to those described in the above embodiments. Various modifications and variations may be made.

The invention achieves the effect of providing a highly reliable non-contact power transmission system with low power consumption. Therefore, the invention is useful for a power transmission control device (power transmission control IC), a power transmission device (e.g., IC module), a non-contact power transmission system, and an electronic instrument (e.g., portable terminal and charger). Note that the term "portable terminal" includes a portable telephone terminal, a PDA terminal, and a portable computer terminal.

What is claimed is:

1. A power transmission control device provided in a power transmission device, the power transmission device being included in a non-contact power transmission system that performs non-contact power transmission from the power transmission device to a power reception device through a primary coil and a secondary coil that are electromagnetically coupled, the power transmission control device comprising,
   a power-transmission-side control circuit that controls power transmission to the power reception device,
   the power-transmission-side control circuit causing the power transmission device to perform temporary power transmission to the power reception device to enable ID authentication on the power reception device when a switch provided in a power-transmission-side instrument has been turned ON, performing ID authentication based on ID authentication information transmitted from the power reception device that has received the temporary power transmission, causing the power transmission device to perform normal power transmission to the power reception device after the conformity of the power reception device has been authenticated by the ID authentication, and causing the power transmission device to stop the temporary power transmission and return to an initial state that waits for the switch to be turned ON when the ID authentication information from the power reception device has not been received within a given period of time after the temporary power transmission has started, or the ID authentication has failed.

2. The power transmission control device as defined in claim 1,
   the power-transmission-side control circuit causing the power transmission device to stop the temporary power transmission and return to the initial state when the ID authentication has successively failed a plurality of times.

3. The power transmission control device as defined in claim 1,
   the power-transmission-side control circuit causing the power transmission device to stop the normal power transmission and return to the initial state when a power transmission stop request from the power reception device has been received after the normal power transmission has started.

4. The power transmission control device as defined in claim 3,
   the power transmission stop request being a full-charge notification from the power reception device.

5. The power transmission control device as defined in claim 1
   the power-transmission-side control circuit causing the power reception device to perform the normal power transmission to the power reception device after the conformity of the power reception device has been authenticated by the ID authentication, determining the presence or absence of a foreign object during the normal power transmission based on a change in waveform of an induced voltage signal of the primary coil, and causing the power transmission device to stop the normal power transmission and return to the initial state when a foreign object has been detected.

6. The power transmission control device as defined in claim 1,
   the power-transmission-side control circuit detecting whether or not a power-reception-side instrument has been removed based on a change in waveform of an induced voltage signal of the primary coil, and causing the power transmission device to stop the normal power transmission when the power-transmission-side control circuit has detected that the power-reception-side instrument has been removed during the normal power transmission.

7. The power transmission control device as defined in claim 1,
the power-transmission-side control circuit detecting whether or not a takeover state has occurred, the normal power transmission being continuously performed in the takeover state while erroneously regarding a foreign object placed between the primary coil and the secondary coil as a power-reception-side instrument, and causing the power transmission device to stop the normal power transmission and return to the initial state when the power-transmission-side control circuit has detected that the takeover state has occurred.

8. The power transmission control device as defined in claim 7,
the power-transmission-side control circuit detecting whether or not the takeover state has occurred by utilizing a phenomenon that a signal transmitted from the power reception device is blocked by the foreign object and does not reach the power transmission device.

9. The power transmission control device as defined in claim 7,
the power-transmission-side control circuit detecting an intermittent change in load of the power reception device, and causing the power transmission device to stop the normal power transmission when the power-transmission-side control circuit cannot detect an intermittent change in the load during the normal power transmission.

10. The power transmission control device as defined in claim 9,
the load of the power reception device being changed cyclically during the normal power transmission; and
the power-transmission-side control circuit causing the power transmission device to stop the normal power transmission when the power-transmission-side control circuit cannot detect a change in the load over a given number of cycles.

11. A power transmission device comprising:
the power transmission control device as defined in claim 1; and
a power transmission section that generates an alternating-current voltage and supplies the alternating-current voltage to the primary coil.

12. A non-contact power transmission system comprising a power transmission device and a power reception device, when a switch provided in a power-transmission-side instrument has been turned ON, the non-contact power transmission system performing non-contact power transmission from the power transmission device to the power reception device through a primary coil and a secondary coil that are electromagnetically coupled,
the power transmission device including a power-transmission-side control circuit that controls power transmission to the power reception device based on an induced voltage in the primary coil;
the power reception device including:
a power supply control section that controls power supply to a power-supply-target load; and
a power reception control device that includes a power-reception-side control circuit that controls the power reception device; and the power-transmission-side control circuit of the power transmission device causing the power transmission device to perform temporary power transmission to the power reception device to enable ID authentication on the power reception device when the switch provided in the power-transmission-side instrument has been turned ON, performing ID authentication based on ID authentication information transmitted from the power reception device that has received the temporary power transmission, causing the power transmission device to perform normal power transmission to the power reception device after the conformity of the power reception device has been authenticated by the ID authentication, and causing the power transmission device to stop the temporary power transmission and return to an initial state that waits for the switch to be turned ON when the ID authentication information from the power reception device has not been received within a given period of time after the temporary power transmission has started, or the ID authentication has failed.

13. The non-contact power transmission system as defined in claim 12,
the power-transmission-side control circuit causing the power reception device to perform the normal power transmission to the power reception device after the conformity of the power reception device has been authenticated by the ID authentication, determining the presence or absence of a foreign object during the normal power transmission based on a change in waveform of an induced voltage signal of the primary coil, causing the power transmission device to stop the normal power transmission and return to the initial state when a foreign object has been detected, and causing the power transmission device to stop the normal power transmission and return to the initial state when a power transmission stop request from the power reception device has been received after the normal power transmission has started.

14. The non-contact power transmission system as defined in claim 13,
the power reception device further including a load modulation section;
the power-reception-side control circuit causing the load modulation section to regularly operate to perform regular load authentication after the normal power transmission has started; and
the power-transmission-side control circuit of the power transmission device detecting a regular change in load of the power reception device, and causing the power transmission device to stop the normal power transmission when the power-transmission-side control circuit cannot detect a regular change in the load during the normal power transmission.

15. A non-contact power transmission system comprising a power transmission device and a power reception device, when a switch provided in a power-transmission-side instrument has been turned ON, the non-contact power transmission system performing non-contact power transmission from the power transmission device to the power reception device through a primary coil and a secondary coil that are electromagnetically coupled,
the power transmission device including a power-transmission-side control circuit that controls power transmission to the power reception device based on an induced voltage in the primary coil;

the power reception device including:
a load modulation section that modulates a load of the power reception device;
a power supply control section that controls power supply to a power-supply-target load; and
a power reception control device that includes a full-charge detection section that detects whether or not the power-supply-target load has been fully charged, and a power-reception-side control circuit that controls the power reception device;
the power-reception-side control circuit causing the power reception device to transmit ID authentication information to the power transmission device due to load modulation by the load modulation section when the power reception device has received the temporary power transmission from the power transmission device, causing the power supply control section to supply power to the power-supply-target load when the power reception device has received the normal power transmission from the power transmission device, causing the load modulation section to operate to intermittently change the load of the power reception device in order to detect a takeover state when power is supplied to the power-supply-target load, and transmitting a full-charge notification to the power transmission device due to load modulation by the load modulation section when the full-charge detection section has detected that the power-supply-target load has been fully charged; and
the power-transmission-side control circuit causing the power transmission device to perform the temporary power transmission to the power reception device to enable ID authentication on the power reception device when the switch has been turned ON, performing ID authentication based on the ID authentication information transmitted from the power reception device that has received the temporary power transmission, causing the power transmission device to stop the temporary power transmission and return to an initial state that waits for the switch to be turned ON when the ID authentication information from the power reception device has not been received within a given period of time after the temporary power transmission has started, causing the power transmission device to stop the temporary power transmission and return to the initial state when the ID authentication has failed, causing the power transmission device to perform the normal power transmission to the power reception device after the conformity of the power reception device has been authenticated by the ID authentication, detecting the presence or absence of a foreign object during the normal power transmission based on a change in waveform of an induced voltage signal of the primary coil, detecting whether or not the takeover state has occurred by determining whether or not a signal based on the intermittent load modulation by the power reception device can be detected, and causing the power transmission device to stop the normal power transmission and return to the initial state when a foreign object or the takeover state has been detected or it has been detected that the power-supply-target load of the power reception device has been fully charged.

16. The non-contact power transmission system as defined in claim 15,
when the power-reception-side control circuit causes the load of the power reception device to be intermittently changed during the normal power transmission, the power-reception-side control circuit performing a load reduction process that reduces a load state of the power-supply-target load by causing the power supply control section to reduce power supplied to the power-supply-target load.

17. An electronic instrument comprising:
a switch that causes power transmission to start or stop; and
the power transmission device as defined in claim 1.

* * * * *